US008826019B2

(12) United States Patent
Shablygin et al.

(10) Patent No.: US 8,826,019 B2
(45) Date of Patent: *Sep. 2, 2014

(54) CENTRALIZED AUTHENTICATION SYSTEM WITH SAFE PRIVATE DATA STORAGE AND METHOD

(71) Applicant: WWPASS Corporation, Bedford, NH (US)

(72) Inventors: Eugene Shablygin, Bedford, NH (US); Mikhail Vysogorets, Moscow (RU)

(73) Assignee: WWPASS Corporation, Manchester, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,778

(22) Filed: Oct. 16, 2012

(65) Prior Publication Data

US 2013/0042110 A1 Feb. 14, 2013

Related U.S. Application Data

(63) Continuation of application No. 12/614,670, filed on Nov. 9, 2009, now Pat. No. 8,327,141.

(60) Provisional application No. 61/150,084, filed on Feb. 5, 2009.

(51) Int. Cl.
*H04L 9/32* (2006.01)
*G06F 21/34* (2013.01)

(52) U.S. Cl.
CPC .................................... *G06F 21/34* (2013.01)
USPC ............................... 713/168; 713/193; 726/9

(58) Field of Classification Search
None
See application file for complete search history.

(56) References Cited

U.S. PATENT DOCUMENTS

| 5,408,633 | A  | 4/1995 | Katsumura et al. |
| 5,485,474 | A  | 1/1996 | Rabin |
| 5,864,854 | A  | 1/1999 | Boyle |
| 6,880,754 | B1 | 4/2005 | Lie-Nielsen et al. |
| 7,058,817 | B1 | 6/2006 | Ellmore |

(Continued)

FOREIGN PATENT DOCUMENTS

| JP | 2005-242740 | 9/2005 |
| JP | 2006-119769 | 5/2006 |
| JP | 2006-172307 | 6/2006 |
| WO | WO2006/131897 A1 | 12/2006 |

OTHER PUBLICATIONS

International Search Report mailed Sep. 17, 2012 in related International Application No. PCT/US2012/44510.

(Continued)

*Primary Examiner* — Fikremariam A Yalew
(74) *Attorney, Agent, or Firm* — Duane Morris LLP

(57) ABSTRACT

A token-based centralized authentication method for providing access to a service provider to user information associated with a user's relationship with the service provider includes the steps of: authenticating a user presenting a user token at a user terminal, the user token having stored thereon a user ID; deriving a resource identifier using at least two data input elements, the at least two data input elements including the user ID of the user and a service provider ID of the service provider, wherein the user information is stored in a storage network and the resource identifier is associated with the user information; retrieving the user information from the storage network using the resource identifier; and providing the retrieved user information to the service provider.

34 Claims, 13 Drawing Sheets

(56) References Cited

U.S. PATENT DOCUMENTS

| | | |
|---|---|---|
| 7,089,224 B1 | 8/2006 | Klug et al. |
| 7,140,036 B2 | 11/2006 | Bhagavatula et al. |
| 7,213,151 B2 | 5/2007 | Guenther et al. |
| 7,296,290 B2 | 11/2007 | Barriga et al. |
| 7,360,087 B2 | 4/2008 | Jorgensen et al. |
| 7,412,434 B1 | 8/2008 | Klug et al. |
| 7,444,666 B2 | 10/2008 | Edwards et al. |
| 7,444,676 B1 | 10/2008 | Asghari-Kamrani et al. |
| 7,457,933 B2 | 11/2008 | Pferdekaemper et al. |
| 7,516,886 B2 | 4/2009 | Gangi |
| 7,546,427 B2 | 6/2009 | Gladwin et al. |
| 7,574,579 B2 | 8/2009 | Gladwin et al. |
| 7,610,382 B1 | 10/2009 | Siegel |
| 7,630,310 B2 | 12/2009 | Bapat et al. |
| 7,752,403 B1 | 7/2010 | Weinman, Jr. |
| 7,818,430 B2 | 10/2010 | Zuckerman et al. |
| 7,818,441 B2 | 10/2010 | Zuckerman et al. |
| 7,818,445 B2 | 10/2010 | Zuckerman et al. |
| 7,818,518 B2 | 10/2010 | Gladwin et al. |
| 7,822,855 B2 | 10/2010 | Zuckerman et al. |
| 7,822,856 B2 | 10/2010 | Zuckerman et al. |
| 7,822,869 B2 | 10/2010 | Zuckerman et al. |
| 7,827,296 B2 | 11/2010 | Zuckerman et al. |
| 7,840,679 B2 | 11/2010 | Zuckerman et al. |
| 7,840,680 B2 | 11/2010 | Zuckerman et al. |
| 7,844,712 B2 | 11/2010 | Zuckerman et al. |
| 7,853,710 B2 | 12/2010 | Zuckerman et al. |
| 7,865,537 B2 | 1/2011 | Kodama et al. |
| 7,904,475 B2 | 3/2011 | Gladwin et al. |
| 7,917,484 B1 | 3/2011 | Vermeulen et al. |
| 7,953,771 B2 | 5/2011 | Gladwin et al. |
| 7,953,937 B2 | 5/2011 | Gladwin et al. |
| 7,962,641 B1 | 6/2011 | Dhuse et al. |
| 8,019,960 B2 | 9/2011 | Gladwin et al. |
| 8,327,141 B2 | 12/2012 | Vysogorets et al. |
| 8,713,661 B2 | 4/2014 | Vysogorets et al. |
| 8,751,829 B2 | 6/2014 | Vysogorets et al. |
| 8,752,153 B2 | 6/2014 | Vysogorets et al. |
| 2001/0037451 A1 | 11/2001 | Bhagavatula et al. |
| 2002/0002658 A1 | 1/2002 | Okayasu |
| 2002/0095588 A1 | 7/2002 | Shigematsu et al. |
| 2003/0014523 A1 | 1/2003 | Teloh et al. |
| 2003/0023880 A1 | 1/2003 | Edwards et al. |
| 2003/0041240 A1 | 2/2003 | Roskind et al. |
| 2003/0046591 A1 | 3/2003 | Asghari-Kamrani et al. |
| 2003/0084288 A1 | 5/2003 | de Jong et al. |
| 2003/0188218 A1 | 10/2003 | Lubbers et al. |
| 2004/0024975 A1 | 2/2004 | Morishita et al. |
| 2004/0054898 A1 | 3/2004 | Chao et al. |
| 2004/0059952 A1 | 3/2004 | Newport et al. |
| 2004/0103064 A1 | 5/2004 | Howard et al. |
| 2004/0128390 A1 | 7/2004 | Blakley, III et al. |
| 2004/0148186 A1 | 7/2004 | Kawashima et al. |
| 2004/0186901 A1 | 9/2004 | Guigui |
| 2004/0221163 A1 | 11/2004 | Jorgensen et al. |
| 2005/0125677 A1 | 6/2005 | Michaelides |
| 2005/0154913 A1 | 7/2005 | Barriga et al. |
| 2005/0193093 A1 | 9/2005 | Mathew et al. |
| 2005/0246393 A1 | 11/2005 | Coates et al. |
| 2006/0053296 A1 | 3/2006 | Busboom et al. |
| 2006/0080545 A1 | 4/2006 | Bagley |
| 2006/0174104 A1 | 8/2006 | Crichton et al. |
| 2006/0212407 A1 | 9/2006 | Lyon |
| 2006/0282678 A1 | 12/2006 | Ali et al. |
| 2007/0044143 A1 | 2/2007 | Zhu et al. |
| 2007/0050179 A1 | 3/2007 | Probst |
| 2007/0067827 A1 | 3/2007 | Bhagavatula et al. |
| 2007/0079081 A1 | 4/2007 | Gladwin et al. |
| 2007/0101413 A1 | 5/2007 | Vishik et al. |
| 2007/0130463 A1 | 6/2007 | Law et al. |
| 2007/0143828 A1 | 6/2007 | Jeal et al. |
| 2007/0150965 A1 | 6/2007 | Redlich et al. |
| 2007/0156592 A1 | 7/2007 | Henderson |
| 2007/0169175 A1 | 7/2007 | Hall et al. |
| 2007/0174192 A1 | 7/2007 | Gladwin et al. |
| 2007/0174905 A1 | 7/2007 | Martherus et al. |
| 2007/0185820 A1 | 8/2007 | Talker |
| 2007/0186277 A1 | 8/2007 | Loesch et al. |
| 2007/0192618 A1 | 8/2007 | Ellmore |
| 2007/0198435 A1 | 8/2007 | Siegal et al. |
| 2007/0226479 A1 | 9/2007 | Coulson |
| 2007/0261114 A1 | 11/2007 | Pomerantsev |
| 2007/0271604 A1* | 11/2007 | Webster et al. .............. 726/10 |
| 2008/0015986 A1 | 1/2008 | Wright |
| 2008/0016232 A1 | 1/2008 | Yared et al. |
| 2008/0034216 A1 | 2/2008 | Law |
| 2008/0048026 A1 | 2/2008 | Gangi |
| 2008/0066156 A1* | 3/2008 | Ikeda et al. .................... 726/3 |
| 2008/0147514 A1 | 6/2008 | Shuster et al. |
| 2008/0147821 A1 | 6/2008 | Dietrich et al. |
| 2008/0154770 A1 | 6/2008 | Rutherford et al. |
| 2008/0168135 A1 | 7/2008 | Redlich et al. |
| 2008/0183975 A1 | 7/2008 | Foster et al. |
| 2008/0207124 A1 | 8/2008 | Raisanen et al. |
| 2008/0208597 A1 | 8/2008 | Chino et al. |
| 2008/0208697 A1 | 8/2008 | Kargman et al. |
| 2008/0282334 A1 | 11/2008 | Yves et al. |
| 2008/0295162 A1 | 11/2008 | Wagner et al. |
| 2009/0013182 A1 | 1/2009 | Asghari-Kamrani et al. |
| 2009/0094250 A1 | 4/2009 | Dhuse et al. |
| 2009/0094318 A1 | 4/2009 | Gladwin et al. |
| 2009/0094320 A1 | 4/2009 | Palthepu et al. |
| 2009/0119757 A1 | 5/2009 | Acuna et al. |
| 2009/0125522 A1 | 5/2009 | Kodama et al. |
| 2009/0138953 A1 | 5/2009 | Lyon |
| 2009/0158029 A1 | 6/2009 | Wheeler et al. |
| 2009/0254572 A1 | 10/2009 | Redlich et al. |
| 2009/0261162 A1 | 10/2009 | Kargman et al. |
| 2010/0017531 A1 | 1/2010 | Dhuse et al. |
| 2010/0023524 A1 | 1/2010 | Gladwin et al. |
| 2010/0023529 A1 | 1/2010 | Gladwin et al. |
| 2010/0023710 A1 | 1/2010 | Gladwin et al. |
| 2010/0063911 A1 | 3/2010 | Gladwin et al. |
| 2010/0115063 A1 | 5/2010 | Gladwin et al. |
| 2010/0161916 A1 | 6/2010 | Thornton et al. |
| 2010/0161926 A1 | 6/2010 | Li et al. |
| 2010/0169391 A1 | 7/2010 | Baptist et al. |
| 2010/0169415 A1 | 7/2010 | Leggette et al. |
| 2010/0169500 A1 | 7/2010 | Quigley et al. |
| 2010/0179966 A1 | 7/2010 | Gladwin et al. |
| 2010/0217796 A1 | 8/2010 | Palthepu et al. |
| 2010/0250497 A1 | 9/2010 | Redlich et al. |
| 2010/0250751 A1 | 9/2010 | Leggette et al. |
| 2010/0266119 A1 | 10/2010 | Leggette et al. |
| 2010/0266120 A1 | 10/2010 | Leggette et al. |
| 2010/0268692 A1 | 10/2010 | Resch |
| 2010/0268806 A1 | 10/2010 | Kumar et al. |
| 2010/0268877 A1 | 10/2010 | Resch et al. |
| 2010/0268938 A1 | 10/2010 | Resch |
| 2010/0269008 A1 | 10/2010 | Leggette et al. |
| 2010/0287200 A1 | 11/2010 | Dhuse |
| 2010/0306578 A1 | 12/2010 | Thornton et al. |
| 2010/0332751 A1 | 12/2010 | Quigley et al. |
| 2011/0016122 A1 | 1/2011 | Motwani et al. |
| 2011/0026842 A1 | 2/2011 | Cilfone et al. |
| 2011/0029524 A1 | 2/2011 | Baptist et al. |
| 2011/0029711 A1 | 2/2011 | Dhuse et al. |
| 2011/0029731 A1 | 2/2011 | Cilfone et al. |
| 2011/0029742 A1 | 2/2011 | Grube et al. |
| 2011/0029743 A1 | 2/2011 | Grube et al. |
| 2011/0029744 A1 | 2/2011 | Leggette et al. |
| 2011/0029753 A1 | 2/2011 | Baptist et al. |
| 2011/0029765 A1 | 2/2011 | Grube et al. |
| 2011/0029809 A1 | 2/2011 | Dhuse et al. |
| 2011/0029836 A1 | 2/2011 | Dhuse et al. |
| 2011/0029842 A1 | 2/2011 | Grube et al. |
| 2011/0055170 A1 | 3/2011 | Mark |
| 2011/0055178 A1 | 3/2011 | Mark |
| 2011/0055273 A1 | 3/2011 | Resch |
| 2011/0055277 A1 | 3/2011 | Resch |
| 2011/0055473 A1 | 3/2011 | Mark |
| 2011/0055474 A1 | 3/2011 | Resch |
| 2011/0055578 A1 | 3/2011 | Resch |
| 2011/0055661 A1 | 3/2011 | Grube et al. |

(56) References Cited

U.S. PATENT DOCUMENTS

| | | |
|---|---|---|
| 2011/0055662 A1 | 3/2011 | Grube et al. |
| 2011/0055903 A1 | 3/2011 | Leggette |
| 2011/0071988 A1 | 3/2011 | Resch et al. |
| 2011/0072115 A1 | 3/2011 | Gladwin et al. |
| 2011/0072210 A1 | 3/2011 | Dhuse |
| 2011/0072321 A1 | 3/2011 | Dhuse |
| 2011/0077086 A1 | 3/2011 | Grube et al. |
| 2011/0078080 A1 | 3/2011 | Grube et al. |
| 2011/0078277 A1 | 3/2011 | Baptist |
| 2011/0078343 A1 | 3/2011 | Resch et al. |
| 2011/0078371 A1 | 3/2011 | Resch |
| 2011/0078372 A1 | 3/2011 | Gladwin et al. |
| 2011/0078373 A1 | 3/2011 | Hoffman et al. |
| 2011/0078377 A1 | 3/2011 | Grube et al. |
| 2011/0078493 A1 | 3/2011 | Grube et al. |
| 2011/0078503 A1 | 3/2011 | Resch |
| 2011/0078512 A1 | 3/2011 | Grube et al. |
| 2011/0078534 A1 | 3/2011 | Resch |
| 2011/0078774 A1 | 3/2011 | Grube et al. |
| 2011/0083049 A1 | 4/2011 | Grube et al. |
| 2011/0083053 A1 | 4/2011 | Grube et al. |
| 2011/0083061 A1 | 4/2011 | Grube et al. |
| 2011/0102546 A1 | 5/2011 | Dhuse et al. |
| 2011/0106769 A1 | 5/2011 | Baptist et al. |
| 2011/0106855 A1 | 5/2011 | Resch et al. |
| 2011/0106904 A1 | 5/2011 | Resch et al. |
| 2011/0106909 A1 | 5/2011 | Gladwin |
| 2011/0106972 A1 | 5/2011 | Grube et al. |
| 2011/0106973 A1 | 5/2011 | Grube et al. |
| 2011/0107026 A1 | 5/2011 | Quigley et al. |
| 2011/0107027 A1 | 5/2011 | Grube et al. |
| 2011/0107036 A1 | 5/2011 | Resch et al. |
| 2011/0107078 A1 | 5/2011 | Resch et al. |
| 2011/0107094 A1 | 5/2011 | Resch et al. |
| 2011/0107112 A1 | 5/2011 | Resch |
| 2011/0107113 A1 | 5/2011 | Resch et al. |
| 2011/0107165 A1 | 5/2011 | Resch et al. |
| 2011/0107180 A1 | 5/2011 | Markison et al. |
| 2011/0107181 A1 | 5/2011 | Markison et al. |
| 2011/0107182 A1 | 5/2011 | Grube et al. |
| 2011/0107184 A1 | 5/2011 | Grube et al. |
| 2011/0107185 A1 | 5/2011 | Grube et al. |
| 2011/0107380 A1 | 5/2011 | Gladwin et al. |
| 2011/0122523 A1 | 5/2011 | Gladwin et al. |
| 2011/0125771 A1 | 5/2011 | Gladwin et al. |
| 2011/0125916 A9 | 5/2011 | Dhuse et al. |
| 2011/0125999 A1 | 5/2011 | Cilfone et al. |
| 2011/0126026 A1 | 5/2011 | Gladwin et al. |
| 2011/0126042 A1 | 5/2011 | Dhuse |
| 2011/0126060 A1 | 5/2011 | Grube et al. |
| 2011/0126295 A1 | 5/2011 | Resch |
| 2011/0161655 A1 | 6/2011 | Gladwin et al. |
| 2011/0161666 A1 | 6/2011 | Gladwin et al. |
| 2011/0161679 A1 | 6/2011 | Grube et al. |
| 2011/0161680 A1 | 6/2011 | Grube et al. |
| 2011/0161681 A1 | 6/2011 | Dhuse et al. |
| 2011/0161754 A1 | 6/2011 | Baptist et al. |
| 2011/0161781 A1 | 6/2011 | Gladwin et al. |
| 2011/0182424 A1 | 7/2011 | Grube et al. |
| 2011/0182429 A1 | 7/2011 | Grube et al. |
| 2011/0184912 A1 | 7/2011 | Baptist et al. |
| 2011/0184997 A1 | 7/2011 | Grube et al. |
| 2011/0185141 A1 | 7/2011 | Dhuse et al. |
| 2011/0185193 A1 | 7/2011 | Grube et al. |
| 2011/0185253 A1 | 7/2011 | Resch et al. |
| 2011/0185258 A1 | 7/2011 | Grube et al. |
| 2011/0202568 A1 | 8/2011 | Gladwin et al. |
| 2011/0213928 A1 | 9/2011 | Grube et al. |
| 2011/0213929 A1 | 9/2011 | Baptist et al. |
| 2011/0213940 A1 | 9/2011 | Gladwin et al. |
| 2011/0214011 A1 | 9/2011 | Grube et al. |
| 2011/0219100 A1 | 9/2011 | Dhuse et al. |
| 2011/0225209 A1 | 9/2011 | Volvovski et al. |
| 2011/0225360 A1 | 9/2011 | Baptist et al. |
| 2011/0225361 A1 | 9/2011 | Resch et al. |
| 2011/0225362 A1 | 9/2011 | Leggette |
| 2011/0225386 A1 | 9/2011 | Motwani et al. |
| 2011/0225450 A1 | 9/2011 | Gladwin et al. |
| 2011/0225451 A1 | 9/2011 | Leggette et al. |
| 2011/0225466 A1 | 9/2011 | Resch et al. |
| 2011/0228931 A1 | 9/2011 | Grube et al. |
| 2011/0231699 A1 | 9/2011 | Gladwin et al. |
| 2011/0231733 A1 | 9/2011 | Cilfone et al. |
| 2011/0261813 A1 | 10/2011 | Baptist et al. |
| 2011/0261819 A1 | 10/2011 | Mark et al. |
| 2011/0261838 A1 | 10/2011 | Baptist et al. |
| 2011/0261839 A1 | 10/2011 | Baptist et al. |
| 2011/0261840 A1 | 10/2011 | Baptist et al. |
| 2011/0264717 A1 | 10/2011 | Grube et al. |
| 2011/0264823 A1 | 10/2011 | Baptist et al. |
| 2011/0264869 A1 | 10/2011 | Baptist et al. |
| 2011/0264950 A1 | 10/2011 | Baptist et al. |
| 2011/0264962 A1 | 10/2011 | Baptist et al. |
| 2011/0264989 A1 | 10/2011 | Resch et al. |
| 2011/0265143 A1 | 10/2011 | Grube et al. |
| 2011/0286594 A1 | 11/2011 | Resch et al. |
| 2011/0286595 A1 | 11/2011 | Resch et al. |
| 2011/0289122 A1 | 11/2011 | Grube et al. |
| 2011/0289215 A1 | 11/2011 | Resch et al. |
| 2011/0289283 A1 | 11/2011 | Baptist et al. |
| 2011/0289358 A1 | 11/2011 | Grube et al. |
| 2011/0289359 A1 | 11/2011 | Resch et al. |
| 2011/0289366 A1 | 11/2011 | Baptist et al. |
| 2011/0289378 A1 | 11/2011 | Grube et al. |
| 2011/0289383 A1 | 11/2011 | Dhuse et al. |
| 2011/0289565 A1 | 11/2011 | Resch et al. |
| 2011/0289566 A1 | 11/2011 | Resch et al. |
| 2011/0289577 A1 | 11/2011 | Resch et al. |
| 2011/0311051 A1 | 12/2011 | Resch et al. |
| 2011/0314058 A1 | 12/2011 | Motwani |
| 2011/0314072 A1 | 12/2011 | Resch et al. |
| 2011/0314154 A1 | 12/2011 | Resch et al. |
| 2011/0314346 A1 | 12/2011 | Vas et al. |
| 2011/0314355 A1 | 12/2011 | Grube et al. |
| 2011/0314356 A1 | 12/2011 | Grube et al. |
| 2012/0027134 A1 | 2/2012 | Gladwin et al. |
| 2012/0030371 A1 | 2/2012 | Baptist et al. |
| 2012/0030437 A1 | 2/2012 | Resch et al. |
| 2012/0030736 A1 | 2/2012 | Resch et al. |
| 2012/0030740 A1 | 2/2012 | Baptist et al. |
| 2012/0054456 A1 | 3/2012 | Grube et al. |
| 2012/0066752 A1 | 3/2012 | Vysogorets et al. |

OTHER PUBLICATIONS

U.S. International Search Authority, International Search Report and Written Opinion of the International Searching Authority dated Dec. 15, 2009.

Wikipedia entry for OPEN ID http://en.wikipedia.org/wiki/Open_id (last modified May 28, 2009) (accessed May 29, 2009), pp. 1-10.

Welcome to Tahoe-LAFS, http://allmydata.org/source/tahoe/trunk/docs/about.html, (accessed Sep. 25, 2009), 2 pages.

Dispersed Storage Networks User Guide, dsNet release Version 1.1 for Open Source, Cleversafe.org, First Edition (Aug. 2009), 13 pages.

Zooko Wilcox-O'Hearn and Brian Warner, "Tahoe—The Least-Authority Filesystem," storageSS'08, Oct. 31, 2008, 6 pages.

Brian Warner, Zooko Wilcox-O'Hearn and Rob Kinninmont, "Tahoe: A Secure Distributed Filesystem," http://allmydata.org/~warner/pycon-tahoe.html, last modified Mar. 1, 2008, (accessed Nov. 11, 2009) pp. 1-15.

The YubiKey Manual, Usage, configuration and introduction of basic concepts, Version 2, Yubico, © 2009, pp. 1-26.

Michael O. Rabin, "Efficient Dispersal of Information for Security, Load Balancing, and Fault Tolerance," Journal of the Association for Computing Machinery, vol. 36, No. 2, Apr. 1989, pp. 335-348.

Daniel Ellard and James Megquier, "DISP: Practical, Efficient, Secure and Fault-Tolerant Distributed Data Storage," ACM Transactions on Storage. vol. 1, No. 1. Dec. 2004, pp. 71-94.

(56) References Cited

OTHER PUBLICATIONS

Supplementary European Search Report dated Sep. 12, 2012 from corresponding EP application No. EP09839818.
Office Action issued Sep. 17, 2013 in corresponding Japanese Patent Application No. 2011-549140.

Cleversafe, Inc., "A Paradigm Shift in Digital Asset Storage—A new storage method is revolutionizing data management, reducing costs while increasing reliability and security", Cleversafe White Paper, Chicago, IL 2012, 11 pages.

* cited by examiner

CENTRALIZED AUTHENTICATION SYSTEM WITH SAFE PRIVATE DATA STORAGE AND METHOD

CROSS-REFERENCE TO RELATED APPLICATIONS

This application is a continuation of U.S. patent application Ser. No. 12/614,670 filed Nov. 9, 2009, which claims priority to U.S. Provisional Patent Application No. 61/150,084 filed Feb. 5, 2009, entitled "Centralized Internet Authentication and Identification Technology with Safe Private Data Storage," the entirety of each of which is hereby incorporated by reference herein.

FIELD OF THE INVENTION

The present invention relates generally to computer systems, methods and computer program products and, more particularly, to electronic commerce and authentication conducted via computer networks.

BACKGROUND OF THE INVENTION

Authentication is the process of validating a set of credentials that are provided by a user or on behalf of a user. Authentication is accomplished by verifying one or more of something a user knows, something a user possesses, or some characteristic about the user through a challenge/response operation using various authentication protocols. For example, verification of something that a user knows may be accomplished through a shared secret, such as a user's password, or through something that is known only to a particular user, such as a user's cryptographic key. Verification of something that a user possesses may employ a smartcard or some other form of hardware token. Verification of a user characteristic might employ a biometric input, such as a fingerprint or a retinal map.

The Internet provides pervasive access to sensitive online information and transactions, including financial account transactions and product ordering transactions. Access to this information must be protected and unauthorized individuals must not be allowed to execute transactions (e.g., issue invalid orders or execute bank account withdrawals). Many online e-commerce providers provide only simple password level protection for such accounts. Some providers provide more sophisticated authentication commonly referred to as multi-factor or two-factor authentication. For example, a provider may require the use of a personal identification number (PIN) in combination with a digital certificate or a set of numbers generated by a token to authenticate a user. Nonetheless, "user ID and password" combination systems remain the most prevalent authentication strategy for authenticating a user attempting to access some remote resource via the Internet. There is a well known compromise between convenience—(i.e., a weak password that is easy to remember)—and security (i.e., a strong password with multiple alphanumeric digits, capitalization rules, etc.). Also, people often use the same user ID/password pair for multiple resources as they simply cannot manage or remember different user ID/password combinations for the large number of resources to which they subscribe. Reuse of these combinations, however, reduces the level of security attainable with this authentication scheme.

The common use of loyalty cards raises a related problem—individuals have too many of them. It is difficult if not impossible for a person to keep them on his or her person at all times. As a result, users often fail to use their loyalty cards, which results in lowered or lost loyalty status, or the user is forced to provide sensitive personal information to a clerk for authentication purposes.

The relative safety of customer/user private data maintained by all of these service providers is also a huge concern. As a rule, every service provider obtains private user data at the time of registration (e.g., user name, phone number, address etc.) and stores this information under a user profile in its own database. Those databases, or parts of them, may be (and quite often are) stolen or breached and then used for criminal purposes. Moreover, combining data from different sources can provide a detailed look into a user's life, providing the opportunity for fraud such as identify, account or credit fraud.

The problems associated with weak authentication and loss of private data present the largest threats to the future of e-commerce.

SUMMARY OF THE INVENTION

A token-based centralized authentication method for providing access to a service provider to user information associated with a user's relationship with the service provider includes the steps of: authenticating a user presenting a user token at a user terminal, the user token having stored thereon a user ID; deriving a resource identifier using at least two data input elements, the at least two data input elements including the user ID of the user and a service provider ID of the service provider, wherein the user information is stored in a storage network and the resource identifier is associated with the user information; retrieving the user information from the storage network using the resource identifier; and providing the retrieved user information to the service provider.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

Figure 1:
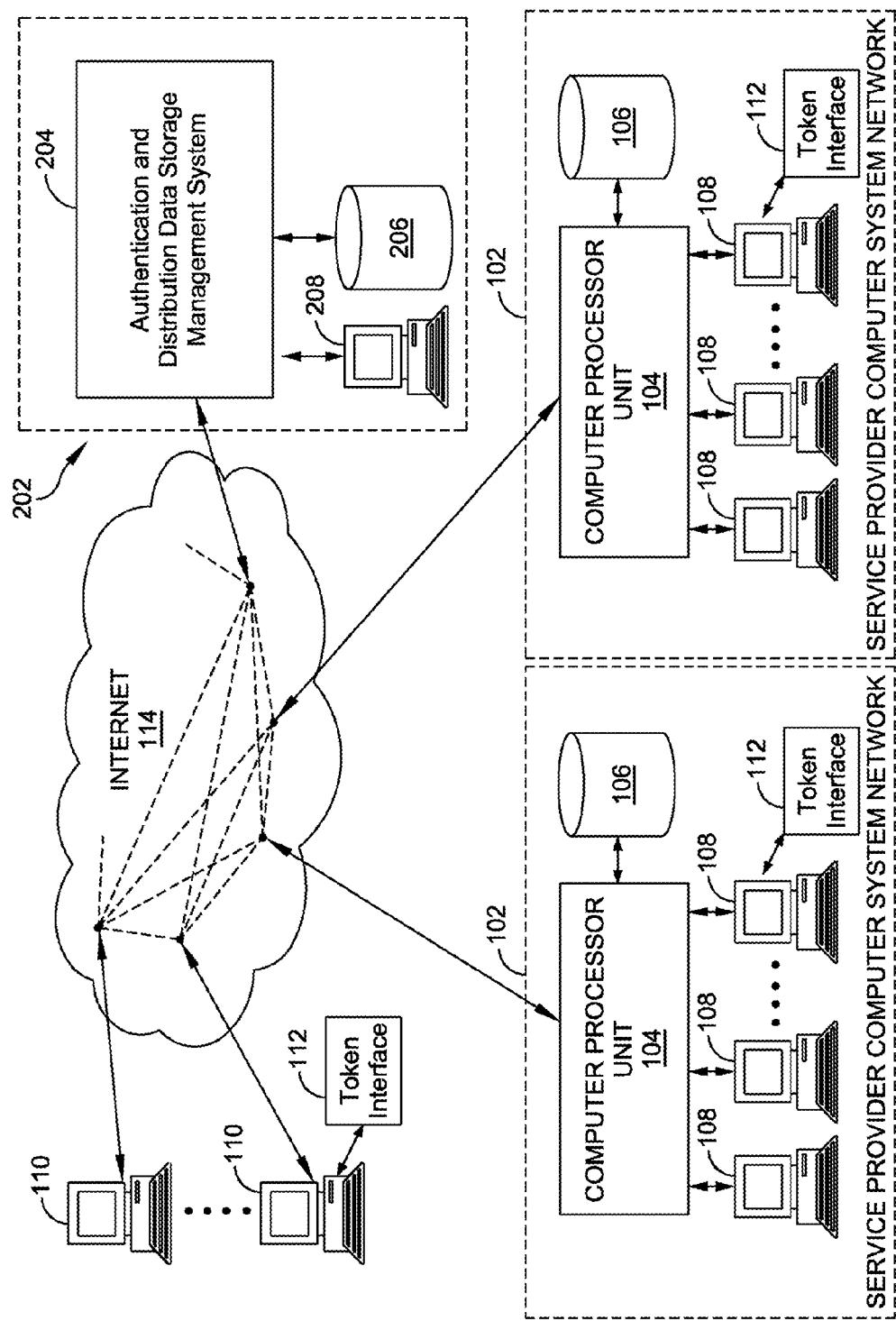
FIG. 1 is a stylized overview of a system of interconnected computer networks, one of which includes an Authentication and Distributed Data Storage Management System.

This description of the exemplary embodiments is intended to be read in connection with the accompanying drawings, which are to be considered part of the entire written description. Terms concerning attachments, coupling and the like, such as "connected" and "interconnected," refer to a relationship wherein components communicate to one another either directly or indirectly through intervening structures, unless expressly described otherwise.

A centralized authentication system with safe private data storage and method of providing centralized authentications with safe private data storage are described herein in connection with the figures. In the following description, it is to be understood that system elements having equivalent or similar functionality are designated with the same reference numerals in the figures. It is to be further understood that aspects of the present invention may be implemented in various forms of hardware, software, firmware, or a combination thereof. In particular, various system modules described herein are preferably implemented in software as an application program that is executable by, e.g., a general purpose computer or any machine or device having any suitable and preferred microprocessor architecture. Various functionality described herein is preferably implemented on a computer platform including hardware such as one or more central processing units (CPU), a random access memory (RAM), and input/output (I/O) interface(s). The computer platform also includes an operating system and microinstruction code. The various processes and functions described herein may be either part of the microinstruction code or application programs which are executed via the operating system. In addition, the computer platform may include various other functional software (e.g., network drivers, communication protocols, etc.) as well as other peripheral devices connected to the computer platform such as an additional data storage device.

Various aspects of the present invention can be embodied in the form of methods and apparatus for practicing those methods. Code to implement the present invention may be embodied in the form of program code operably disposed in tangible media, such as in system memory or stored on storage media such as a fixed disk, floppy disk, CD-ROM, hard drives, or any other machine-readable storage medium wherein, when the program code is loaded into and executed by a machine, such as a computer, the machine becomes an apparatus for practicing the invention. The code for implementing various aspects of the present invention may be transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. For the purpose of this disclosure, the term "processor" may be used to refer to a physical computer or a virtual machine.

It is to be further understood that, because some of the constituent system components described herein are preferably implemented as software modules, the actual system connections shown in the figures may differ depending upon the manner in which the systems are programmed. It is to be appreciated that special purpose microprocessors may be employed to implement various aspects of the present invention. Given the teachings herein, one of ordinary skill in the related art will be able to contemplate these and similar implementations or configurations of the present invention.

Before describing in detail the various aspects of the present invention, a general introduction to an environment in which the invention may be deployed is presented in connection with FIG. 1.

With reference to FIG. 1, the Internet 114 is a worldwide system of computer networks—a network of networks in which a user at one computer or other device connected to the network can obtain information from any other computer and communicate with users of other computers or devices. The most widely used part of the Internet is the World Wide Web (often-abbreviated "WWW" or called "the Web").

One of the most outstanding features of the Web is its use of hypertext, which is a method of cross-referencing. In most Web sites, certain words or phrases appear in text of a different color than the surrounding text. This text is often also underlined. Sometimes, there are hot spots, such as buttons, images, or portions of images that are "clickable." Clicking on hypertext or a hot spot causes the downloading of another web page via a protocol such as hypertext transport protocol (HTTP). Using the Web provides access to millions of pages of information. Web "surfing" is done with a Web browser, such as Apple SAFARI® and Microsoft INTERNET EXPLORER browsers. The appearance of a particular website may vary slightly depending on the particular browser used. Versions of browsers have "plug-ins," which provide animation, virtual reality, sound, and music. Interpreted programs (e.g., applets) may be run within the browser.

FIG. 1 shows a plurality of interconnected computer system networks 102 and devices 110. More specifically, the networks 102 may be computer system networks run by service providers. A typical networked computing environment can be broadly described as comprising "users" and "service providers." A service provider delivers some form of information, informational access, or access to resources to a user electronically via computer systems and networks, such as those shown in FIG. 1. A user may be regarded as a consumer of the provided service. In general, many different types of service providers may be present in a given networked environment, such as the environment shown in FIG. 1. Online merchants represent a class of e-commerce service providers, while Web portals represent a class of information service providers. Internet service providers are entities that provide a network communication link to the Internet as a service. Many of these service providers provide access to their particular service or resource only after a user has been properly authenticated. The service provider then makes use of the aspects of the user's identity it has been authorized to access. Non-limiting examples of service providers include public or corporate WEB-services such as e-commerce sites (e.g., Amazon.com), public mail servers (e.g., mail.google.com), wikies, social network services (e.g., facebook.com), traditional brick-and-mortar merchant systems (e.g., sales systems at Macy's or Home Depot), and traditional and on-line banking services, to name a few.

Each service provider computer system network 102 may include a corresponding local computer processor unit 104, which is coupled to a corresponding local data storage unit 106 and to local network user terminals 108. A computer system network 102 may be a local area network (LAN) or part of a wide area network (WAN), for example.

The illustrated environment also includes a third-party (i.e., not a "user" and not a "service provider" as discussed above) authentication system 202, which includes a processing system identified as Authentication and Distributed Data Storage Management System 204. In certain embodiments, the Authentication and Distributed Data Storage Management System 204 provides a vehicle for providing mutual authentication during a transaction. That is, the authentication operations of the system can be used to authenticate not only the user but also the service provider before any data from its secured data storage is released. Moreover, as part of this authentication process, the Authentication and Distributed Data Storage Management System 204 itself can be authenticated to the user and the service provide as provided in more detail in the remainder of this description. The system 204 includes local computer processing units 208 (such as for performing administrative actions) and local storage 206. The system 202 is shown coupled to the user computer processing units 110 and networks 102 through the Internet 114, but it should be understood that communications between these devices and networks can also be by way of a private network or dedicated connection.

Each of the plurality of user devices 110 and local user terminals 108 (collectively, user terminals) may have various devices connected to their local computer systems, such as scanners, barcode readers, printers, finger print scanners, mouse devices, keyboards, and other interface devices, such as Token Interface 112 described in more detail below.

The processor unit 104 of the service provider computer system network 102 can take the form of a server and provide front-end graphical user interfaces (GUIs) for providing its associated services/resources to local and remote user terminals 108, 110. The processor unit 104 can also provide back-end GUIs, for example, used by system administrators. Local and remote terminals 108, 110 are said to be "clients" of the processor unit 104. A "client" is any computer or device that is capable of connecting to a server computer (referred to as the "host") or device through a network, wired or wireless. A client may also refer to computer software or firmware that calls and connects to a server. The aforementioned GUIs can take the form of, for example, a webpage that is displayed using a browser program local to the user terminal 108, 110. Front- and back-end GUIs may be portal pages that includes various content retrieved from the one or more data storage devices 106. As used herein, "portal" is not limited to general-purpose Internet portals, such as YAHOO! or GOOGLE but also includes GUIs that are of interest to specific, limited audiences and that provide the user access to a plurality of different kinds of related or unrelated information, links and tools as described below.

A user may gain access to the services/resources provided by a service provider's computer processor unit 104 of the computer system network 102 by using a user device 108, 110, programmed with a Web browser or other software, to locate and select (such as by clicking with a mouse) a particular webpage (or "page" accessible via local area network). The content of the webpage is located on the one or more data storage devices 106. The user devices 108, 110 may be microprocessor-based computer terminals that can communicate through the Internet using the Internet Protocol (IP), Kiosks with Internet access, connected personal digital assistants or PDAs (e.g., a PALM® device manufactured by Palm, Inc., IPAQ® device available from Compaq, iPHONE® from Apple, Inc. or BLACKBERRY® device from RIM), or other devices capable of interactive network communications. User devices 108, 110 may be wireless devices, such as a hand-held unit (e.g., a cellular telephone or a portable music player such as an iPod® device) that connect to, and communicate through, the Internet using a wireless access protocol (WAP) or other protocols. Other types of devices may also be substituted in the system for user devices 108, 110. One non-limiting example may be a door lock having an embedded processor without a visual browser that generates GUIs for a user display but rather that makes hidden requests to a pre-defined Web server and in accordance with a reply from the Web server performs some operations, e.g., triggers a switch or relay, responds with a reply, etc. In order to access a secure area, the user presents an ID Token to an appropriately configured reader. The service provider in this example can be viewed as the corporate IT or security system.

The system and method described herein may be implemented by utilizing all or part of the environment described above in connection with FIG. 1. It should be apparent to one of ordinary skill in the art that the system may be incorporated in a LAN, in a WAN, or through an Internet 114 based approach, such as through a hosted or non-hosted application service, or through a combination thereof.

Figure 2:
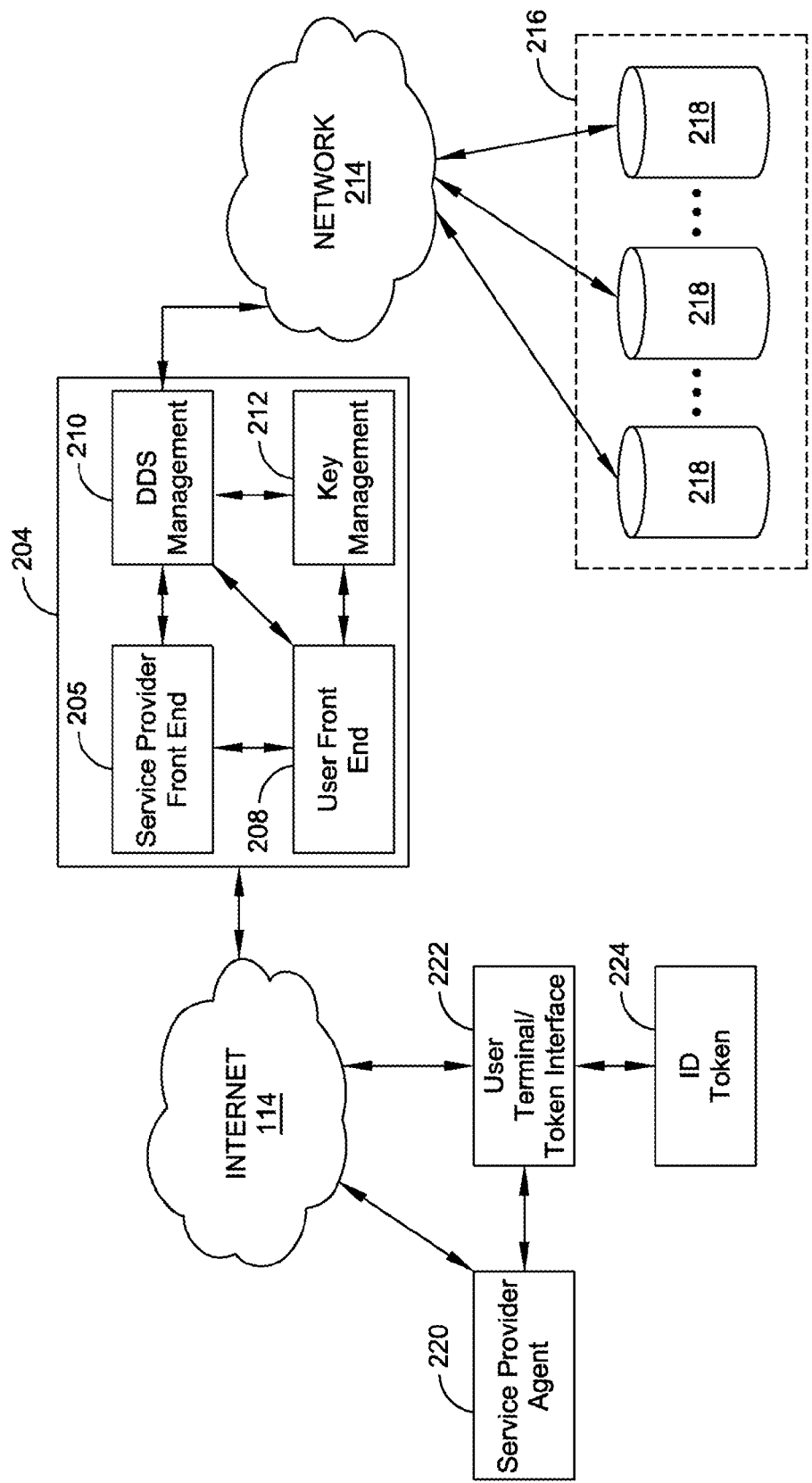
FIG. 2 illustrates the Authentication and Distributed Data Storage Management System of FIG. 1 in more detail along with its connections for interfacing with a Service Provider Agent, User Terminal and Distributed Data Storage System.

FIG. 2 illustrates a particular embodiment of a centralized authentication system with safe private data storage that may be implemented using the computing environment illustrated in FIG. 1. The Authentication and Distributed Data Storage Management System 204 includes a Service Provider Front End module 205 for interfacing with the Service Provider Agent 220, a User Front End module 208 for interfacing with the combined User Terminal/Token Interface 222, a Distributed Data System Management module 210 and a Key Management module 212. An ID Token 224 is shown in communication with the User Terminal/Token Interface 222, which is in communication with the Service Provider Agent 220 either locally or remotely through Internet 114. Service Provider Agent 220 and User Terminal/Token Interface 222 communicate with the Authentication and Distributed Data Storage Management System 204 through a network, such as Internet 114.

Although FIG. 2 illustrates a single Service Provider FE 205 and a single User Front End 208, it should be understood that this is for illustrative purposes only. That is, in embodiments the system can include multiple instances of both the Service Provider FE 205 and User Front End 208 each with its own respective address. These front ends can be located at a single node or at multiple nodes. This provides two advantages. First, for a geographically distributed system, users and service providers can be connected to the nearest front ends. Second, in the case a node fails, it is still possible for service provider and user to access other front ends.

As described above, a service provider delivers some form of information, informational access, or access to other resources or services (collectively or individually, "resource") to a user electronically via computer systems and networks, such as those shown in FIG. 1. A user may be regarded as a consumer of the provided service. The service provider can be thought of as an entity that provides some Internet (or other networked) service either directly to the consumer (e.g., e-commerce) or indirectly (e.g., by maintaining a loyalty program which the user uses either in person or remotely). In a second sense, the service provider can be thought of as combination of computer programs, computers, network links that implement the functionality of this Internet (or other networked) service. Therefore, in order to resolve this uncertainty, this aspect of the service provider is referred to herein as the Service Provider Agent (SPA). Quite often the programs used by service providers to implement the Service Provider Agent are web servers and data base management systems, to name a few.

Authentication and Distributed Data Storage Management System 204 is in communication with Distributed Data Storage 216 through network 214, which may be a public network such as the Internet 114 or a private network. Distributed Data Storage 216 includes multiple, preferably geographically distributed, storage nodes 218.

The system shown in FIG. 2 is designed to facilitate user authentication with service providers for secure interactions between private users and public service providers, as well as provide secure data storage of user private data on behalf of the service providers or users. In various embodiments, discussed below, a User Identification code (User ID) and Service Provider Identification code (Service Provider ID) are used in retrieval of user data from Distributed Data Storage 216. Preferably, these codes are not known to the Authentication and Distributed Data Storage Management System 204 on a permanent basis. Instead, they become known (if at all) only during a user authentication phase while the user is being authenticated.

In embodiments, all user data are dispersed in accordance with a selected information dispersal algorithm (IDA) over multiple networked storage nodes in such a way that it is not possible to reconstruct the whole record or part of it from not more than some predefined minimum number of storage nodes 218. IDA algorithms are discussed in more detail below. User data stored as a user profile can include personal and financial data associated with a specific user, such as a user name, a user address, a phone number, a user e-mail address, a credit card number, credit card expiration date, a bank account number, a bank routing number, a user social security number, a user driver's license number, a user identification number, a user's place of birth, a user's date of birth, a user's mother's maiden name, and any other personal identification information relevant to the user-service provider relationship. User data can also include preference data, such as at least one shopping profile, at least one music profile, at least one banking profile, and other data that indicates the user's preferences for transactions, vendors, products, or services of various kinds as well as historical data representing the user's status in a loyalty program or other indicia of the user's previous transaction history with a given service provider.

As one means to authenticate a particular user, the system makes use of portable devices such as hardware identification tokens (ID Tokens 224), which hold the aforementioned User ID and one or more User Data Encryption keys. In exemplary embodiments, any cryptographic calculations are performed and protocols reside in the ID Token 224 itself, rather than in the User Terminal 222. The Terminal 222 only helps to pass messages to/from the ID Token 224 and other components in the system. This approach allows any suitably configured user terminal, not necessarily only "trusted" terminals, to be used in the system since all secure elements are in the ID token 224, which is produced in accordance with established security measures known in the art for both hardware and software. The system is thus very secure and mobile, i.e., the ID Token 224 can be used with a wide array of unsecure computers, pay terminals, etc.

As a result of both service provider and user authentication, the system can obtain an access code, corresponding to user data stored in a data container associated with the authenticated user/service provider pair. This access code is used by the system to retrieve the data container from the secure storage of the system. This access code is referred to herein as a "resource identifier" and is discussed in more detail below.

One advantageous feature of the system is that every act of User/Service Provider authentication involves the generation of a temporary transaction identifier (e.g., a ticket), which is unique in time and space. The ticket allows the system to associate a user with a service provider during a given transaction. The system know to whom it issued the ticket and learns the identity of party that returns the ticket to the system. Ticket life cycle starts when either side (ID Token 224 user or Service Provider Agent 220) requests a new ticket and ends when the other side (Service Provider Agent or User) produces this ticket back to the system. The association between the service provider and the user is established when the ticket circulates through the system For example, if a user (through the ID Token 224) initiates the transaction by requesting a ticket, then the ticket traverses the following circular path: User FE 208 of the Authentication and Distributed Data Storage Management System 204→ID Token 224→Service Provider Agent/Web Server 220→Service Provider FE 205 of System 204→User FE 205 of the System 204. Conversely, if a service provider (through the Service Provider Agent/Web Server 220) initiates the transaction by requesting a ticket, then the ticket traverses the following circular path: Service Provider FE 205 of the Authentication and Distributed Data Storage Management System 204→Service Provider Agent/Web Server 220→ID Token 224→User FE 208 of System 204→Service Provider FE 205 of the System 204.

The ticket may carry various information. In embodiments, this information is a combination of human-readable Service Provider name, network node address from where this ticket was issued, and a "number used once" (nonce) based on a random number.

The security of user private data is ensured via a number of measures. First, in embodiments, necessary user access and encryption keys are kept only on portable ID Tokens 224. Most of this information is not known to the System 204 on any permanent basis (i.e., the data are not stored on hard disks or other kind of non-volatile memory). For user authentication to be successful, mutual authentication (e.g., authentication of the ID token 224 and Service Provider Agent 220, as well as authentication of the Authentication and Distributed Data Storage Management System 204 to the ID token 224 and Service Provide Agent 220) is employed.

The ID Token 224 preferably is a physical object such as a hardware token or an embedded token, containing a computer chip, integrated circuitry, smart card chip or software, or combination thereof. If ID Token 224 is a hardware token, it preferably takes the form of a ring or other jewelry; a dongle; an electronic key; a card, such as an IC card, smart card, RF ID or proximity card, debit card, credit card, ID badge, security badge, parking card, transit card; or the like. If the ID token 224 is an embedded token, it preferably takes the form of a cell phone; a personal digital assistant (PDA); a watch; a computer; computer hardware; or the like. The ID Token 224 preferably includes an I/O support element or device interface that may take the form of any number of different apparatuses, depending upon the particular application in which it is used and depending upon the type of device with which it interacts. In embodiments, the I/O interface includes a port, such as a wireless communications port (e.g., Near Field Communication (NFC) interface), a serial port, a USB port, a parallel port, or an infrared port, or some other physical interface for communicating with an external electronic apparatus, whether by contact or contactless method.

Second, in embodiments, each service provider is registered in the Authentication and Distributed Data Storage Management System 204 in the same way as private users, i.e. all service providers are given a unique Service Provider ID and corresponding access keys and encryption keys. The service provider must pass mutual authentication procedures before being provided access to user data.

Third, in embodiments, the User ID and Service Provider ID pair, made known during the authentication process, are used to form an access code (i.e., the "resource identifier") that identifies a Data Container in the storage system 216. This Data Container holds a user's private data that a particular Service Provider is allowed to access, use and/or modify. The Data Container can be analogized to a safe deposit box where two keys are needed to open it—one belongs to a bank, the other to the client. Each relationship that a user has with a service provider is associated with its own data container since all Service Provider ID/User ID pairs are unique.

Fourth, in embodiments, to provide reliable storage of Data Containers the system adds some redundancy information and scatters the user data over multiple network storage nodes 218. When data is read back, the combination of the User ID and Service Provider ID are used in defining a particular set of storage nodes, and the way to restore the integrity of the Data Container. Distributed data storage is preferred for most applications but is not a requirement of all embodiments of the invention.

Fifth, in embodiments, the use of redundancy information ensures that it is still possible to reconstruct a Data Container in the event that some storage nodes (i.e., not more than some predefined minimum number of them) become non-functional.

Sixth, in embodiments, Data Containers are ciphered by secret keys, which become known as a result of user authentication. In addition, Data Containers may be ciphered by Service Provider secret keys.

Seventh, in embodiments, as mentioned above Data Containers can be identified by a unique combination of User ID and Service Provider ID. However, if the identifier (in some cases just a "filename") is a mere concatenation of those IDs, there may be potential security issues. For example, person, having an access to a full list of available Data Containers can find all the data, associated with a particular User ID. To avoid this possibility, the combination of User ID and Service Provider ID is transformed by one-way function to produce the Data Container resource identifier so that it is not possible (in any practical sense) to restore either the User ID or the Service Provider ID from resulting access codes.

System from the User Point of View:

From the user point of view, user authentication is based on at least the "what somebody has" principle—ID Token 224. As described above, the ID Token 224 is preferably a small electronic device that the user has at his disposal. FIGS. 3A-3D illustrate just some of the many possible embodiments of an ID Token 224. From the user's point of view, the ID Token 224 is a "universal key" that opens many doors (i.e., it can be used to authenticate the user to many different service providers).

For applications of an ID Token device requiring high security, the device—or the device in combination with an I/O support element—may include the following components: a keypad (alphanumeric), interactive display, or other type of user data entry mechanism (collectively referred to herein as "User Interface") that allows a user to compose or modify a message; a User Interface for inputting data representing a secret (it should be noted that the User Interface for generating or modifying a message may, but does not have to, be the same as the User Interface for the entry of the data representing a secret); a display for showing the message and/or secret to the user; a scanner or reader for receiving at least one type of biometric data for a biometric characteristic of the user; memory for securely storing a secret of the authorized user, biometric data of the authorized user, and/or other security information; a processor or circuitry for verifying input of the secret or biometric data as being that of the authorized user; a processor or circuitry for generating or originating digital signatures; and/or an output for outputting from the device and transmitting information including the message and digital signature therefor. Preferably, the device also includes memory for storing and exporting encryption key(s), a Token ID, a User ID, and other information. For lower security applications, not all of the above elements are necessary.

In certain embodiments, the ID token is smart enough to ask for a second kind of authentication criteria, such as a "what you know" authenticator (e.g., PIN) for critical applications and to display a service provider name during the authentication process.

Figure 3:
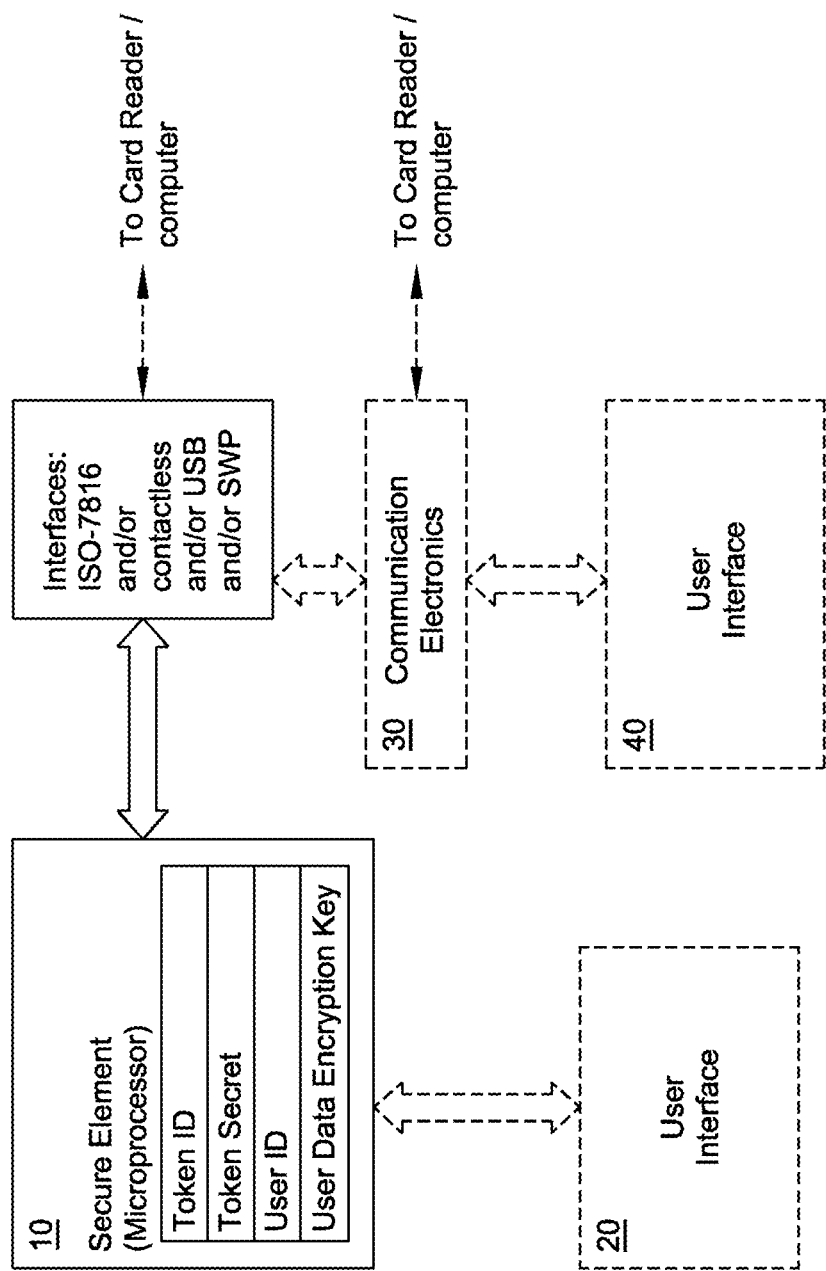
FIG. 3 is a block diagram of an ID Token for use in the system of FIG. 2 and FIGS. 3A-3D illustrate various embodiments of ID Tokens.

FIG. 3 is a block diagram of the functional components of the ID Token 224. The heart of ID token is Secure Element 10, which includes a microprocessor, memory (e.g., RAM and ROM memories) for operating instructions and data storage, and input/output interfaces. The microprocessor operates in accordance with a program resident in its memory. As discussed in detail in the following sections, every ID Token has stored in its memory a Token ID, a Token Key, a User ID and optionally a User Data Encryption Key. The Token ID is a unique number assigned to this token and known to the authentication system. It is not a secret parameter and is used for authenticating the ID Token.

The Token Key is a secret parameter. This Token Key is also known to the authentication system. This Token Key is used for token-to-system mutual authentication and creation of a ciphered communication channel between the system and the token.

The User ID is the most sensitive parameter stored in the ID Token. This User ID is used to derive a resource identifier (e.g., Data Container name) used in retrieval of the user's stored data. If sent outside of the ID Token at all, it should only be sent to the authentication system via a ciphered channel.

The User Data Encryption Key is optional and used in some applications where data may (and preferably is) encoded/decoded by the ID Token. For example, a user could use the distributed data storage system for password storage or storage of other personal data. The user accesses this data through a User Terminal. When retrieved from the storage system, the User Terminal can pass the retrieved data to the ID Token for decryption and return to the User Terminal for viewing and/or editing the data, and pass the data back to the ID Token for encryption before transmission back to the distributed data storage system for storage.

The architecture of the Secure Element as well as its software ensure that the Token Key (and, in some cases the User Data Encryption Key) cannot be exported from the token memory. They also ensure that the User ID may be transmitted only via ciphered channel.

One possible implementation of the Secure Element is a cryptographic card. Available cards can communicate by a legacy ISO-7816 contact interface, a contactless interface (e.g. ISO 14443) or a USB interface (or any combination of these interfaces). In some cases the Secure Element may have a SWP-interface for communication with an external contactless transceiver. This Secure Element may be packaged in an "ID-1" plastic body (e.g., a well-known bank card body) or may be included in a SIM card, which has a secure microprocessor and memory, as used in mobile phones. Alternatively, the Secure Element may take the form of a packaged die with pins for soldering (or other connection) to an appropriately configured ID Token body with interface connections for power and communications.

The simplest form of ID token is an ID-1 smart card which connects to a computer via USB interface or via a card reader. In that case it is responsibility of software at a User Terminal to show a Service Provider name and accept user consent for authentication (described in various embodiments below).

Some embodiments may allow for the Secure Element to have its own user interface 20, i.e. display, buttons, touch screen, and the like. This solution is preferred as it does not depend on any software at the user terminal.

If the Secure Element does not have its own user interface 20, it may be embedded in a housing, e.g., a MP3 player, PDA or mobile phone, that provides its own user interface 40 as well as its own electronics 30 for communicating with an external User Terminal (e.g., card reader or computer). Some mobile phones, PDAs and the like may already include components 10, 30 and 40. The ID Token functionality could then be implemented in an application of the device. The Secure Element may be a 3G multi-application SIM card or specially installed second cryptographic element. Any number of interfaces (e.g. Bluetooth or USB) may be used to connect the device to the User Terminal.

Figure 3A:
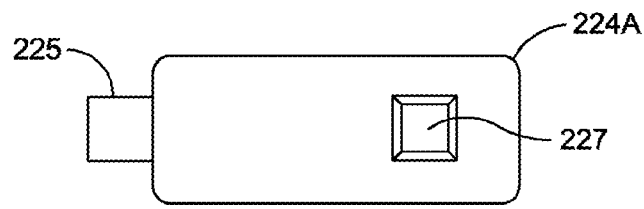

The User Terminal may include, if necessary, software for routing various communications between the browser resident on the User Terminal, the User Front End 208, and the ID Token 224. This software can be permanently resident on the User Terminal, such as in the form of a browser plug-in, or in form of drivers or executable programs, including programs running as a service (daemons). Some parts of User Terminal software may be downloaded each session as, for example, an applet. A servlet based approach may also be used. FIG. 3A illustrates a basic smart card or fob type ID token 224A. The ID token 224A includes an I/O 225, such as a USB connector, for interfacing with an I/O interface of a User Terminal/Token Interface 222, which may be either a specialty terminal (such as a Point of Sale terminal of a merchant) located at the service provider premises or the user's computer, which has Internet access. Instead of a wired interface, such as a USB interface, the ID token 224A can have a wireless interface for interfacing with a suitably configured User Terminal/Token Interface. In embodiments, the ID token 224A also includes an activation button 227 ("consent" button).

Figure 3B:
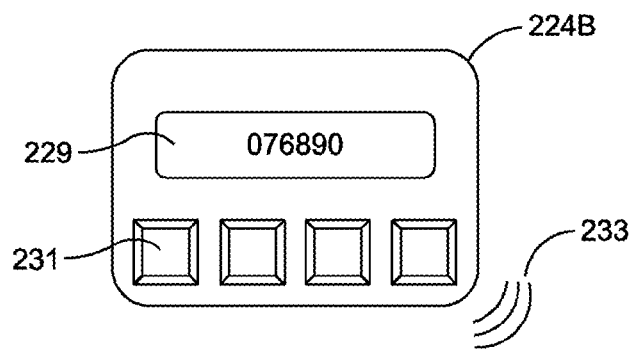
Figure 3C:
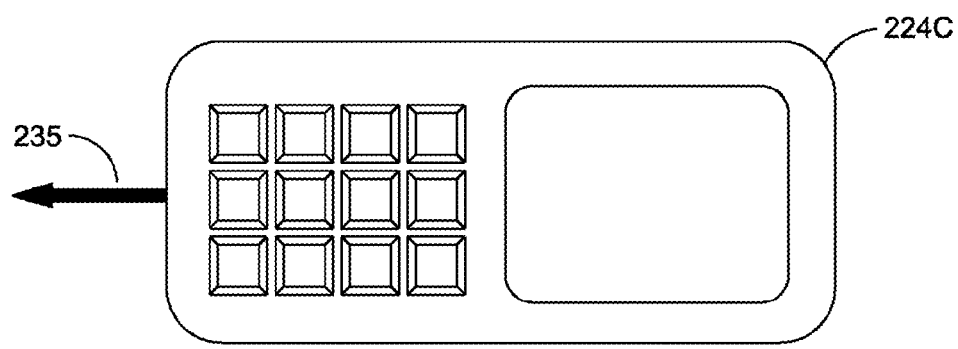
Figure 3D:
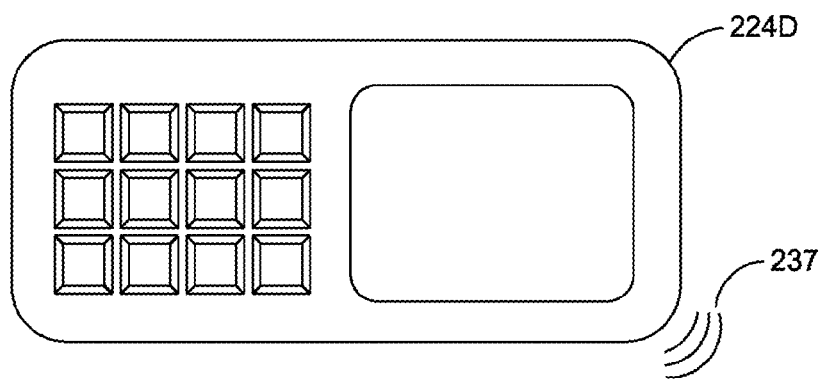

FIG. 3B illustrates an alternative embodiment of an ID token 224B. The ID token 224B has a user interface including a screen or display 229 and input buttons 231. The ID token 224B also includes a wireless communications interface (illustrated by wireless communications 233), such as a Infrared Data Association (IrDA) interface, contactless Near Field Communications (NFC) interface, or Bluetooth interface. FIGS. 3C and 3D illustrate that ID token functionality may be incorporated into mobile phones 224C and 224D as applications resident on the phones. In the embodiment of FIG. 3C, the mobile phone 224C can be connected to the USB port of a User Terminal/Token Interface 222 by a wired connection 235. Alternatively, in the embodiment of FIG. 3D, the mobile phone 224D can communicate with the User Terminal/Token Interface 222 wirelessly (as illustrated by wireless communications 237), such as by way of NFC, Bluetooth, SMS/GPRS/3G or other appropriate technology.

In order to authenticate a user accessing the website of a particular service provider, or to authenticate the user at a service provider premises (i.e., at a POS terminal), the user connects his ID Token 224 to a User Terminal/Token Interface 222, which may be the user's personal computer or a terminal at the service provider. The user presses a button on the Token 224 to confirm that the user seeks to be authenticated to the service provider. In embodiments, the consent button could be implemented as a soft button on the display of the User Terminal. As a result of token authentication and service provider authentication (the processes of which are described in detail below), the service provider is provided access to the user's data needed by the service provider for interaction with the user. This data (e.g., a customer profile) are retrieved from Distributed Data Storage 216, assembled and sent to the Service Provider Agent 220. The user data allows the service provider to know, for example, how to address the user, how loyal the user is and what kind of discounts should be provided. The service provider can modify the user's data and send it back to Authentication and Distribution Data Storage Management System 204 for safe storage in the Distributed Data Storage 216. Sensitive data are not maintained at the Service Provider Agent/Web Server or associated data storage and thus are not vulnerable to inappropriate access.

As noted above, the functionality of the system is similar to that of a safe deposit box. Personal data, granted to a service provider by the user, are stored in the virtual safe deposit box. To open the box two keys are needed: one from the user and one from the service provider. Once the box is open, the service provider obtains the data and uses it in a current session with the user. When the session is over, the service provider may put modified data back into the safe deposit box or return the box with the content unmodified.

It is important to note that each "safe deposit box" or "data container" contains only data relevant to a particular user/service provider pair. This user data is generated as part of the user's registration at a service provider's website or at the time of issuing a loyalty card and may be updated as the relationship with the user progresses to reflect the user history with the provider. By "registration" it is meant an operation in which a user provides identity information to a service provider in order to establish a permanent relationship with the service provider; thereafter, the service provider recognizes the user through some form of authentication credentials. User data for another service provider is stored in a separate data container ("box") and are available only to that particular service provider.

System from Service Provider Point of View:

To use the Authentication and Distributed Data Storage System for third-party identification/authentication and for safe private data storage, the service provider must first register with the Authentication and Distributed Data Storage Management System 204. The service provider is assigned a Service Provider ID and one or more secret keys for authentication and traffic ciphering. These secret keys and Service Provider ID can be provided in the form of smart USB tokens that are installed on the Service Provider's servers, such as at the USB port of the servers. If the service provider uses a hosting service as its Service Provider Agent 220, then this information can be provided as, for example, a software token to the hosting service. Any necessary software is then installed at the Service Provider Agent/Web Server 220 for enabling this kind of third-party identification/authentication. For example, the software may include, generally speaking, a library—analogous to what is provided by the OpenID Foundation for those web entities using their authentication system. The library is installed on the server and modifications are made to the service provider's WEB files/programs to call this library's procedures for user authentication/database requests. By way of example, the Apache Web Server, which is the most widely used server today, is configured to be able to use external modules for authentication. Module names start with mod_auth_XXX, where XXX is authentication method. So, this module can be provided for use by a service provider server. The service provider may choose to trust the Authentication and Distributed Data Storage Management System 204 with storing user data associated with a specific user. Alternatively, in cases where the service provider already has a large investment in a reliable database and does not want to redesign its core technologies, it is possible to store within the Distributed Data Storage System 216 only certain pieces of information, such as the Service Provider's local user ID that it associates with the presented user. It should be understood that this form of user data need not necessarily be, but may be, stored in a distributed format. No matter which kind of service is chosen, the user experience will be the same.

If the service provider interacts with the user through a webpage, the service provider preferably modifies its login page to add an appropriate graphical symbol, textual prompt (analogous to the OpenID or Microsoft LiveID single sign on service symbols) or button that allows a user to authenticate himself/herself using the user's ID Token 224. When the user presses on the button or points-and-clicks the graphical symbol, a new graphical user interface (e.g., webpage) may be displayed to the user. This new graphical user interface prompts the user to plug-in (by wired or wireless connection) his ID Token 224 and activate the user's ID Token 224 (e.g. press the "consent" button in the embodiment of FIG. 3A). When the user activates the ID Token 224, a new authentication transaction begins. A temporary transaction identifier (e.g., "ticket") is created and used in the authentication process of authenticating both the user and/or the service provider (described in more detail below). The ticket is issued by the Authentication and Distributed Data Storage Management System 204 and passed between the User Terminal/Token Interface 222 and the Service Provider Agent 220. If authentication is successful, the Service Provider Agent 220 receives the stored user data from Authentication and Distributed Data Storage Management System 204. For example, the Service Provider Agent 220 can receive all the information about a particular user that has been gathered to date by the Service Provider, i.e., the user information that was gathered during initial user registration with this Service Provider along with historical data (e.g., purchase or other transaction history, etc.). If the Service Provider had chosen to keep all user data in its own database, then the retrieved data may carry only a pointer (or reference, or key) to the user record, such as in the form of a user identifier used in the database system accessible to the Service Provider Agent 220.

Figure 4:
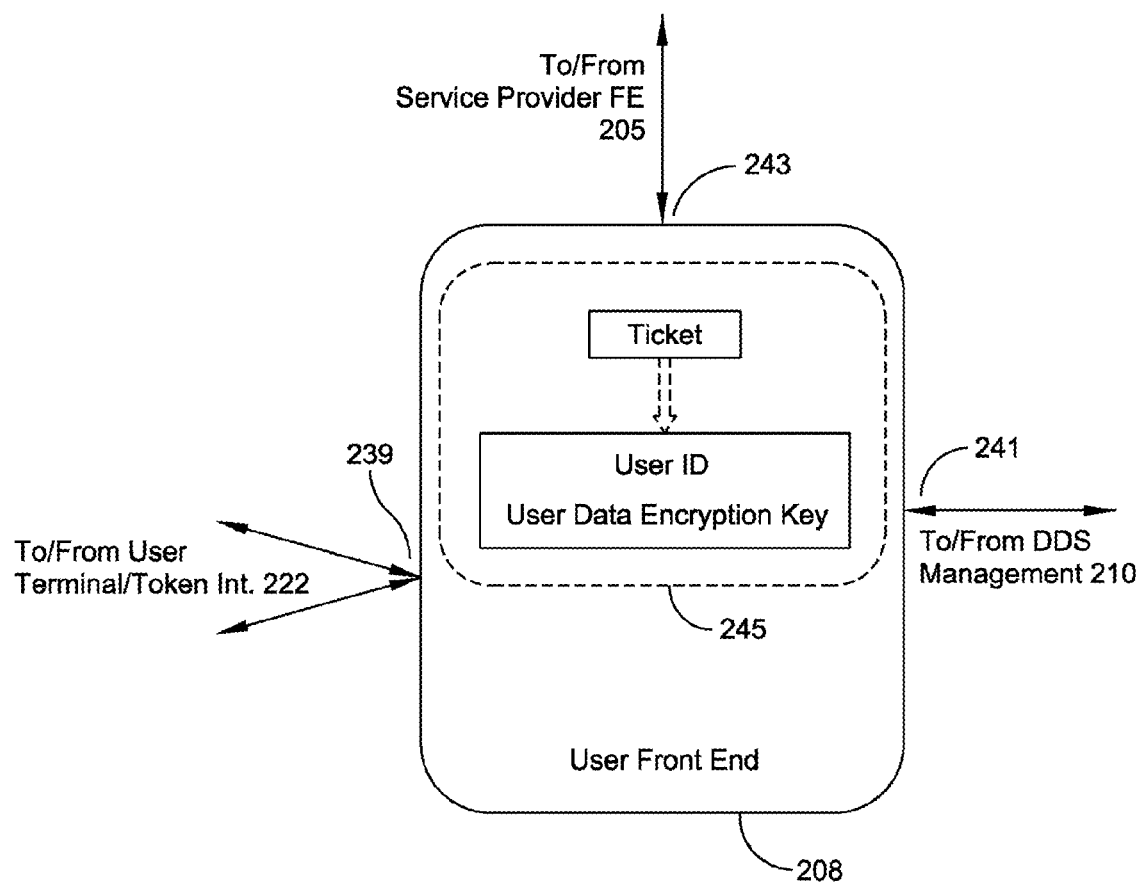
FIG. 4 illustrates the User Front End component of the Authentication and Distributed Data Storage Management System with its main links to other parts of the system.

FIG. 4 is a schematic illustration of the User Front End module or engine 208 of the Authentication and Distributed Data Storage Management System 204. The User Front End (User FE) 208 preferably takes the form of a computer program that runs on a networked computer. This computer has a processor, random access memory, a number of network interfaces and a mass storage device (e.g., hard disk drive). If this computer is used solely for the purpose of User FE functionality, then data stored on a hard disk includes principally operating system files and the User FE program. The User FE 208 also includes configuration data, which is used to discover other components of the Authentication and Distributed Data Storage Management System 204 (e.g., Distributed Data Storage Management engine 210, Service Provider Front End engine 206 and Key Management engine 212), to the extent those other components are resident on other networked computers/processors forming Authentication and Distributed Data Storage Management System 204 or at other IP addresses in a network (virtual or otherwise). From a network point of view, the User FE 208 uses Internet Protocol (IP) for communications with other devices and has three principal connection points. The first connection of interest is connection 239 from the User Terminal/Token Interface 222 to the User FE 208 as a token server. This token server has a public IP address and is the entry point for all authentication requests from User Terminals/Token Interfaces 224. Those requests may arrive from all over the world. User FE 208 has another IP connection 241, which is a connection point to Distributed Data Management engine 210. The User FE 208 uses this connection 241 to read data containing ID Token symmetric keys for mutual User FE/ID Token authentication. This connection is an intra-system connection and may have an internal system IP address (e.g., an address inside a Virtual Private Network (VPN)). Finally, the User FE 208 has a connection 243 to exchange data (e.g., tickets, User IDs or other information) with Service Provider Front End 205. This connection may also use an intra-system network connection through, for example, a VPN.

The User Front End 208 is responsible for authentication of the user using ID tokens 224. Authentication is based on a unique token number and the User FE's knowledge of a token secret key. The token secret key (as well as enabled/disabled state and other possible parameters) may be stored in an external storage system, such as the Distributed Data Storage System 216 managed by Distributed Data Storage Management engine 210. This option allows the User FE 208 not to keep records describing tokens in its memory or attached mass storage devices. After successful authentication, the ID token 224 sends its real secret data—the User ID, which is a unique user number stored on the ID token 224 in the system and used in data retrieval from the Distributed Data Storage System 216. The User ID should not be confused with a Token ID, which is another ID stored on the token but not used in connection with a Service Provider ID for retrieval of a data container. When User FE 208 receives this User ID, it generates a temporary data structure 245 in its random access memory. This data structure 245 holds information on a newly created transaction:

(i) a unique identifier of the transaction (referred to herein as "temporary transaction identifier" or "ticket"), which preferably includes a random number and the network address of the User FE 208;

(ii) User ID; and (iii) a User Data Encryption Key (optional).

Every transaction is assigned a "time-to-live" parameter, which represents the maximum time period the transaction may be kept in the memory of User FE 208. Regardless of the time-to-live parameter, the data structure 245 can be used as a means to supply the Service Provider Front End 205 with the data contained therein.

Figure 5:
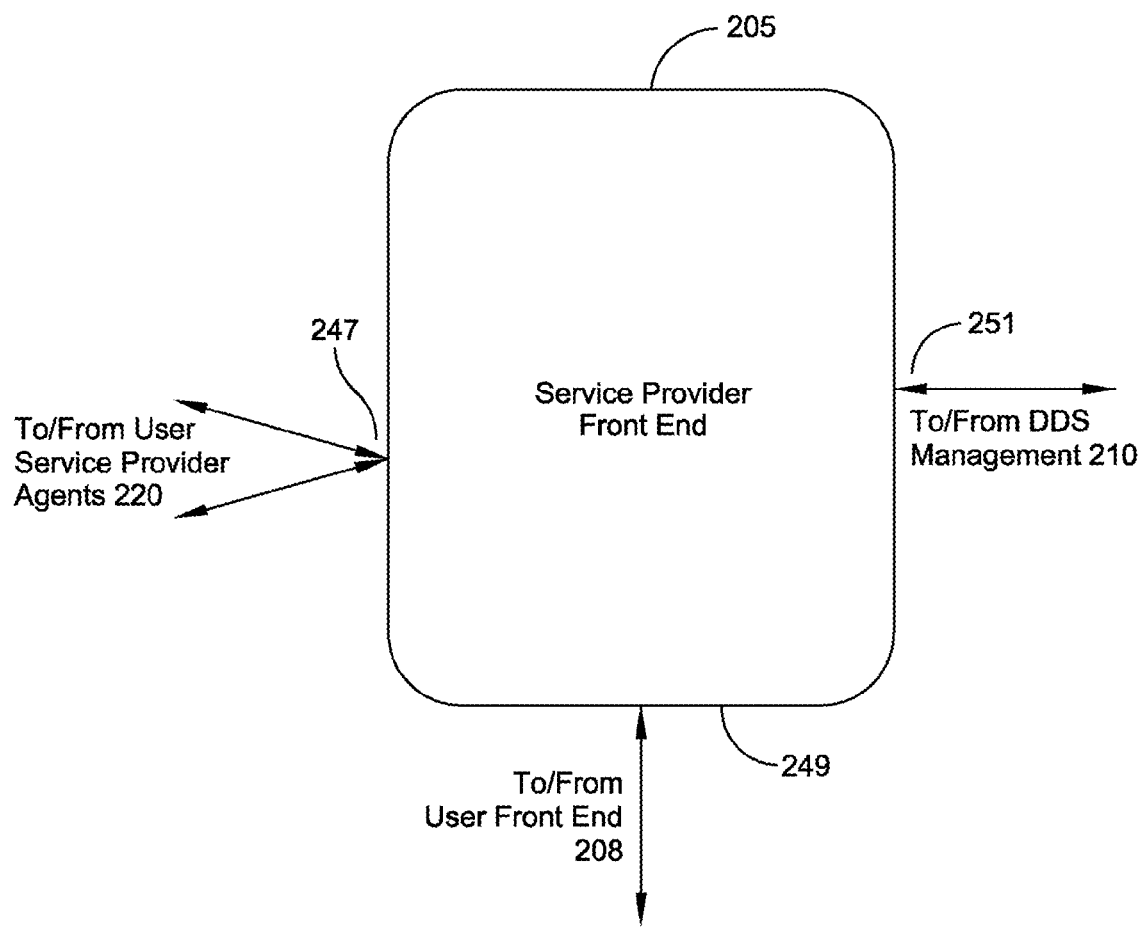
FIG. 5 illustrates the Service Provider Front End component of the Authentication and Distributed Data Storage Management System with its main links to other parts of the system.

FIG. 5 is a schematic illustration of the Service Provider Front End module or engine 206 of the Authentication and Distributed Data Storage Management System 204. The Service Provider Front End 205 preferably takes the form of a computer program that runs on a networked computer. This computer has a processor, random access memory, number of network interfaces and mass storage device (e.g., hard disk drive). If this computer is used solely for the purpose of Service Provide FE functionality, then data stored on a hard disk includes principally operating system files and the Service Provider FE program. The Service Provider FE 208 also includes configuration data, which is used to discover other components of the Authentication and Distributed Data Storage Management System 204 (e.g., Distributed Data Storage Management engine 210 and User Front End engine 208), to the extent those other components are resident on other networked computers/processors forming Authentication and Distributed Data Storage Management System 204 or are located at another IP address. From a network point of view, the Service Provider Front End 205 supports Internet Protocol (IP) communications and has three connection points. A first connection point 247 is an access point for Service Provider Agents 220. This access point 247 is preferably by way of a public IP address and is used for all exchanges with Service Provider Agents 220. Service Provider Front End 205 has a second IP connection point 251 for communicating with Distributed Data Storage Management engine 210. The Service Provider Front End 205 uses this connection to receive/send data containers containing user data to the Distributed Data Storage Management engine 210. Being an intra-system connection, this connection may have an internal system IP address, for example an address inside a VPN. Finally, the Service Provider Front End 205 preferably has a third connection 249 for exchanging data (tickets, User IDs or other information) with User Front End 208. This connection also uses an intra-system network address, for example an address in a VPN.

The Service Provider Front End 205 can be considered a "socket" in the Authentication and Distributed Data Storage Management System 204 to which Service Provider Agents 220 connect in order to obtain user data from the system. The Service Provider Front End 208 is responsible for authentication of Service Provider Agents 220, transaction identifier ("ticket") transfer and user data exchange between the Authentication and Distributed Data Storage Management System 204 and the Service Provider Agents 220. In embodiments described more fully below, when the Service Provider Front End 205 receives a "ticket" from a Service Provider Agent 220, it calculates a network address of the User FE 208 that issued the ticket and then requests the User ID and (optionally) User Data Encryption Key from the User FE 208. Next, the Service Provider FE 205 combines Service Provider ID and User ID, and obfuscates this combination to obtain a resource identifier identifying a Data Container. A Service Provider Agent 220 requests the Distributed Data Storage Management System 204 to execute a particular operation (create, read, write or delete) on the Data Container. In the case of a "create" operation, an empty Data Container may be created. When it is a "read" operation, the Data Container is provided by DDS Management System 210 to the Service Provider FE 205, optionally decrypted with a User Data Encryption key, and sent to the Service Provider Agent 220.

For "write" operations, the Service Provider FE 205 receives data for reliable storage from Service Provider Agent 220. Service Provider FE 205 optionally encrypts this data with a User Data Encryption Key and sends the Data Container to Distributed Data Storage Management System 210 for storage. A "delete" operation requests that Distributed Data Storage Management System 210 destroy a Data Container.

Figure 6:
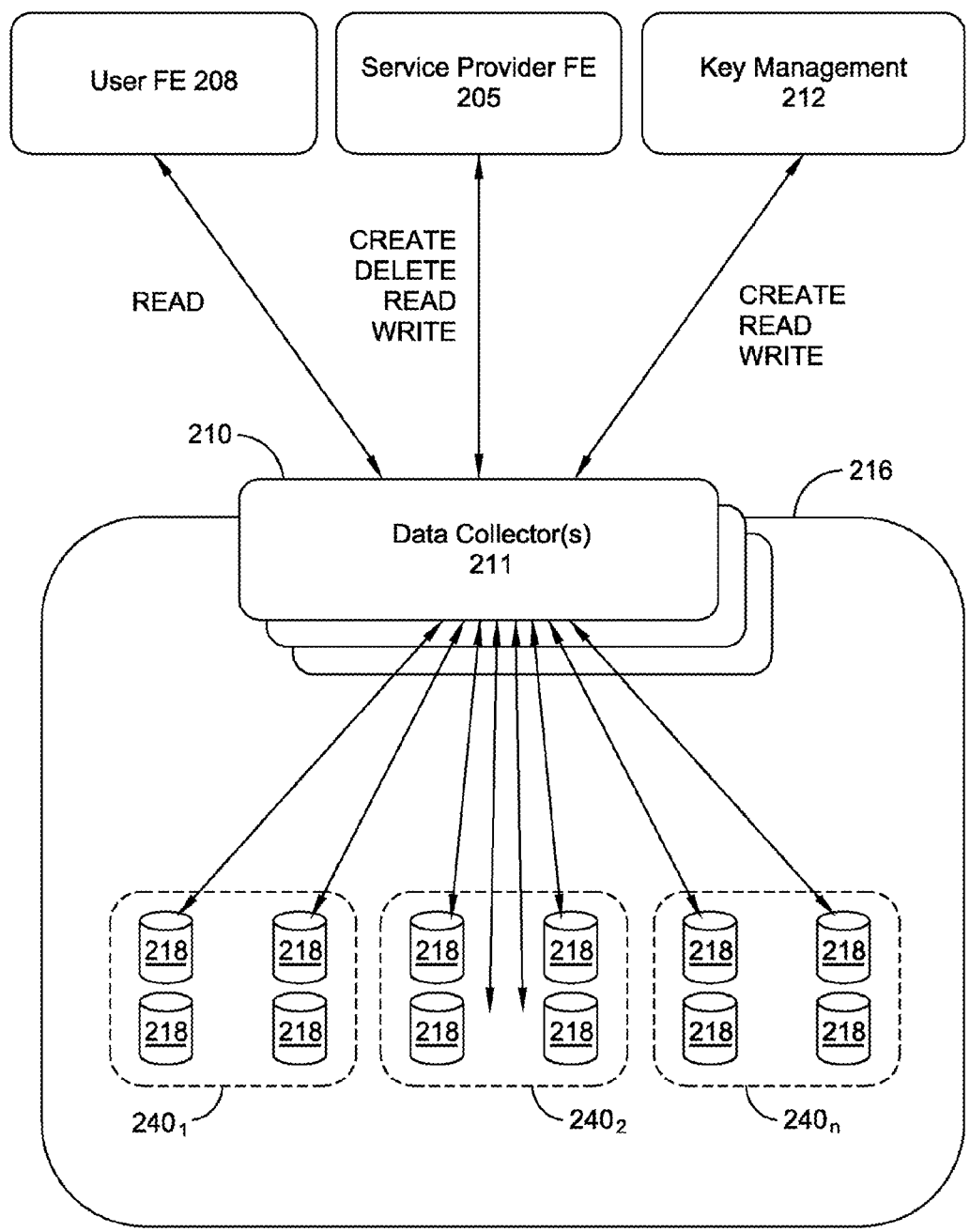
FIG. 6 illustrates the Distributed Data Storage System of FIG. 2 in more detail with its connections to various other components of the system.

FIG. 6 illustrates in more detail the Distributed Data Storage (DDS) 216 and its connections. DDS 216 is used in the system to keep two kinds of system resources: (i) Data Containers having ID Token secret keys and ID Token status, and (ii) Data Containers having private user data. All Data Containers are identified by a resource identifier (i.e., file name) that is derived with an algorithm based on a combination of unique identifiers in the system, namely (in the case of a Data Container having user data) the User ID and Service Provider ID. Other values may also contribute to the combination. This combination is obfuscated by one-way function. A "one-way function" is a function that is easy to compute but whose inverse is very difficult to compute. The result of the one-way function provides the resource identifier that is used to retrieve a data container from the DDS 216. The purpose of obfuscation is to make it impossible (in any practical sense) to restore the User ID and/or Service Provider ID from the resource identifier.

In one exemplary embodiment, the obfuscation uses a RSA encoding procedure with a known public key. In cryptography, RSA (which stands for Rivest, Shamir and Adleman) is an algorithm for public-key cryptography. RSA is widely used in electronic commerce protocols, and is believed to be secure given sufficiently long keys. RSA uses a public key and a private key. The public key can be known to anyone and used for encrypting messages. Messages encrypted with the public key can only be decrypted using the private key. The public key consists of the modulus "n" and the public (or encryption) exponent "e." The private key consists of the modulus "n" and the private (or decryption) exponent "d" which must be kept secret. The authentication system generates a public/private key pair. The public key is stored at the node in the system responsible for generating the resource identifier (e.g., ID Token 224 or Authentication and Distributed Data Storage Management System 204 depending on the embodiment). The private key is either destroyed/deleted or set aside in highly secure storage for data recovery in case of disaster. In order to derive the resource identifier, the User ID and Service Provider ID are first concatenated. That is, for illustrative purposes only, if User ID is (in binary) 0110 and the Service Provider ID is 1110, then the concatenation (User ID|Service Provider ID) is 01101110. This concatenation is then encrypted with the public key, i.e., resource identifier= ((User ID|Service Provider ID)**e) mod n. The public key encryption acts as a one-way function since the private key is unavailable to decrypt the resource identifier to reveal the User ID and Service Provider ID.

The DDS includes a plurality of storage nodes 218. The DDS Management engine 210 preferably includes one or more Data Collectors 211. The storage nodes 218 are networked computers, equipped with hard disks (e.g., solid state disk drives). Their primary task is to permanently store user data. The Data Collector(s) 211 receive requests from User FE 208, Service Provider FE 205 and Key Management 212 engines. Those requests are to "CREATE", "READ", "WRITE", or "DELETE" a named resource. The essential part of each request is the resource identifier. In certain embodiments, the resources are stored in a distributed manner in accordance with an Information Dispersal Algorithms (IDA). When a resource is stored (a WRITE operation) in the system, the Data Collector 211 executes the IDA to convert the resource data into a plurality (e.g., 10-20) of data segments and calculated derivatives thereof (for redundancy) and sends each segment to a separate storage node 218. To execute a READ request, the Data Collector 211 first collects the corresponding segments from the nearest storage nodes 218, and, in case one or more nodes 218 fail, the Data Collector 211 obtains other nodes 218 for their segments. The intrinsic redundancy of the IDA is used to preserve data and can also be used to check for data errors.

Various IDA's may differ in particular details, such as the matrix and arithmetics used, and whether the IDA tries to identify errors itself or in reliance on some other data. But IDAs tend to work in the same way. The operation of an IDA can be illustrated by the following examples. Assume a long number, such as 12345678, is to be stored in a distributed manner. To store the number safely, it is divided into two halves: 1234 and 5678. The first half (1234) is stored at a first storage node (node #1) (e.g., first data server). The second half (5678) is stored at a second storage node (node #2). Next, some derivative of the halves is calculated, such as the sum of the halves, i.e., 6912. This derivative is stored at a third data storage node (node #3). With this approach, any one of three storage nodes can be lost/corrupted/unavailable and the original data can be restored from the remaining two nodes. For example, if node #1 is down, the original data can be restored using the values in node #2 and #3. That is, the data in node #1 is restored by subtracting the data in node #2 from the data in node #3. Likewise, if node #2 is unavailable, its data can be derived by subtracting the value in node #1 from the value in node #2.

By increasing the storage 1.5 times (when compared to simply storing 1234 and 5678 in two nodes), the original information is recoverable if two storage nodes are available. It is noted that the user of derived redundancy segments also reduces the storage requirements. That is, if pure mirrored redundancy were used, four storage nodes (i.e., two nodes for storing 1234 and two nodes for storing 5678) would be required. Further, while using more storage nodes (four rather than three), not all combinations of nodes can be used to restore the original data. For example, the original data cannot be restored from two nodes having stored therein 5678.

The above-described three node redundancy scheme can be modeled as (m,k)=(2,1), m+k=n=3, where m represents the size (in segments) of the original data and the absolute minimum number of segments required to restore information, k represents the redundancy data (i.e., the number of segments of data that can be lost), and n represents the total number of chunks.

Even better results can be obtained if a fourth storage node is added for storing the difference between the data in the second and first nodes, i.e., 4444 (5678−1234). The storage is double (when compared to merely storing the data in two nodes) but any two segments of data can be used to restore the original information, even if none of the segments containing original (i.e., non-derived) data portions (e.g., 1234 and 5678) is available. For example, if both node #1 and node #2 are unavailable, the content of these nodes, and thus the content of the original data, can be restored from node #3 and node #4, i.e., the value of the contents of node #2 is: (nodes #4+#3)/2, and the value of the content node #1 is: (node #3−node #4)/2.

Moreover, if an individual node is still responding but returns corrupted data instead of the real information, this can be detected and the original data restored.

This redundancy scheme can be modeled as (2,2) where m=2, k=2, n=4. Using four storage nodes, any two can be lost and the remaining two can be used to restore the original data.

In an exemplary embodiment, the IDA used by the system to store the user data in distributed form is the Reed-Solomon algorithm. From a very high level and simplified perspective, the Reed-Solomon algorithm works in accordance with the foregoing description, though using Galua fields and polynomial algebra. That is, the algorithm breaks the original data into multiple parts or chunks and provides data redundancy, as opposed to simply mirroring the original data (i.e., storing the same chunk of data multiple times). The algorithm conforms to the (m,k), m+k=n scheme described above. That is, there are "n" nodes, and at least any "m" of them can be used to recover the original information. There are an additional "k" nodes for redundant data. Errors (totaling k/2) can also be detected and corrected when k/2 nodes appear functional at first glance but actually provide corrupt data.

In exemplary embodiments, the IDA has 12 nodes and conforms to a (6,6) scheme. However, greater (or less) redundancy can also be built in, such as (6, 12) and (8, 16) schemes.

Another way to protect the user data is to cipher them with a symmetric key. The key may be calculated as a hash of a concatenated User ID and Service Provider ID.

The storage nodes 218 are preferably distributed over a predefined geographical zones $240_1$ to $240n$, where n is preferably 3 or more, in such a way that it is impossible to restore data from nodes 218 belonging to a single zone 330. On the other hand, it should be possible to restore data even in case a whole zone 240 of storage nodes is nonfunctional. For a (12, 6) IDA scheme, the latter condition may be met by three zones 240 with four nodes each. For a (16,8) IDA scheme, 6, 5 and 5 storage nodes 218 are required in three different zones.

Figure 7A:
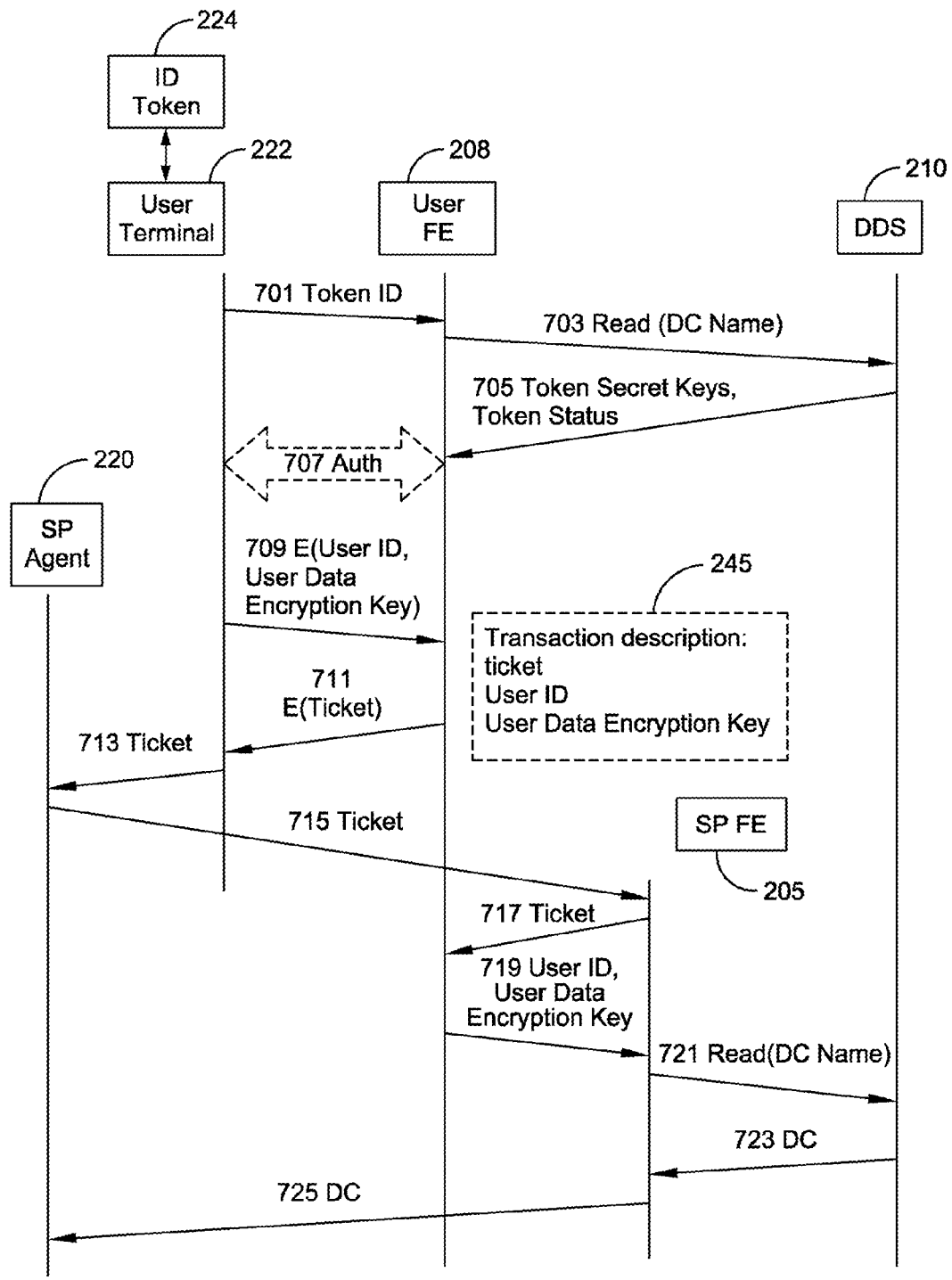
FIG. 7A is a message sequence chart for user authentication at a Service Provider and user data retrieval according to a first embodiment of the present invention.

FIG. 7A is message sequence diagram for user authentication at a particular Service Provider Agent 220 where the temporary transaction identifier ("ticket") is issued by the User FE 208. In the authentication method illustrated by the sequence diagram of FIG. 7A, the ID Token 224 starts the process, asking for a new ticket from the User FE 208. The User FE 208 logically links the ticket and User ID. The ID Token 224 sends the ticket to the Service Provider Agent 220. Then, the ticket is produced to the Service Provider FE 205. The Service Provider FE 205 obtains the node address of ticket issuer (i.e., of User Front FE 208). The Service Provider FE 205 then obtains the User ID. It is now possible to retrieve corresponding user data. The Service Provider FE 208 links both User and Service Provider Agent IDs and asks the Distributed Data Storage Management engine 210 for the user data that corresponds to this pair. Finally the user data is collected by Data Collector(s) 211 and sent to the Service Provider Agent 220.

With specific reference to FIG. 7A, the process starts when the user presents himself/herself to a service provider, such as when the user accesses the webpage of a Service Provider Agent 220. The user is prompted to authenticate himself/herself using the user's ID Token 224. For example, one way to prompt the user is to send a webpage with a HTML form in it to the User Terminal/Token Interface 222. The user connects the ID Token 224 to the User Terminal/Token Interface 222 (via, for example, USB port, contactless reader, or by taking appropriate steps with the user's mobile phone) and presses the soft or hard "consent" button. The ID Token 224 then starts the process of mutual authentication with the User FE 208. The Token 224 sends and receives messages to/from the User FE 208 via the User Terminal 222. The authentication and data retrieval sequence described below follows.

For communications between the ID Token 224 and the User FE 208, any number of standard mutual authentication algorithms may be used, such as those explained in the ISO/IEC-9798 specification, the entirety of which is hereby incorporated by reference herein. The details of this mutual authentication are not described herein so as to avoid unnecessarily obscuring the details of the present invention. Only a very high level illustration of this authentication procedure is discussed below in connection with messages 701 to 709, with certain features unique to the present system also described in connection therewith.

Every ID Token 224 uses its own authentication key, known to the authentication system. An essential part of any authentication is the sending of the Token ID from the ID Token 224 to the authentication system. This is shown at message 701 where the ID Token 224 sends its Token ID (which is not to be confused with the User ID) to the User FE 208.

The Authentication and Distributed Data Storage Management System 204 stores some information about each token that it creates. This information includes at least a token state (enabled or blocked) and token symmetric keys for use in token authentication. This information is stored in a data container in the same Distributed Data Storage System 216 as the user data (i.e., as the data containers associated with a user/service provider pair). Therefore, a resource identifier is used to retrieve this information from the storage system. The User FE 208 has the Token ID (from message 701) and some predefined number (TSPID), which serves as a virtual SP ID. Essentially, TSPID is a system ID that is used in combination with any given Token ID for purposes of deriving a data container name. The User FE 208 uses both identifiers to calculate a data container name (i.e., a resource identifier) for a data container having the token information described above for the presented ID Token 224. In exemplary embodiments, this resource identifier is derived by using the TSPID and Token ID as inputs to a one-way function Obf(TSPID, Token ID). At message 703, the User FE 208 sends this resource identifier to the DDS system 210 with a READ request (shown as READ(DC Name), i.e., READ (Obf (TSPID, Token ID)). Passing the resource identifier queries the DDS Management engine 210 for the information on (i) whether this Token ID is registered in the system and is active (i.e., not blocked or deactivated) and (ii) the cipher keys associated with the token.

The system does not use a single "master key" for all tokens. Therefore, there is no master key that can be stolen and used to compromise the system. Separate symmetric keys are used for each ID Token 224 issued by the system. Even then, these keys are not stored in a single place. Rather, the keys are distributed over the DDS system the same way user data (i.e., data containers storing user data) are stored in the system.

The DDS Management engine 210 uses the data container name to retrieve the data container containing the token's secret key(s) and status from DDS System 216. At message 705, the data container is sent to the User FE 208. The use of "key(s)" illustrates that a single key can be used to encrypt communications back and forth between the user FE 208 and the ID Token 224, or separate keys can be used for encrypting communications to the User FE 208 and from the User FE 208, At this point, the User FE 208 continues the authentication process, which normally results in generation of a session key or keys, which will be used to encrypt all subsequent messages between the ID Token 224 and the User FE 208 during this session. As determined by the authentication algorithm that is employed, the ID Token 224 and the User FE 208 exchange communications to complete the mutual authentication. This exchange for completion of the mutual authentication is shown as messages 707 in FIG. 7A. A session key is derived from symmetric authentication keys and random challenges exchanged during authentication. Any session keys may be encrypted using the key retrieved from the DDS system 210 and sent to the ID Token 224.

At message 709, the ID Token 224 uses the session key to encrypt the User ID it has stored in secure storage and (optionally) a User Data Encryption Key and sends them to the User FE 208. The User FE 208 decrypts this message and creates and stores in its random-access memory a data structure 245, which describes this authentication process. This data structure holds the User ID and the optional User Data Encryption Key along with a temporary transaction identifier ("ticket"). In embodiments, the ticket is a time and space unique identifier of the transaction. For example, the ticket can be a string of ASCII or UTF-coded symbols including a temporarily unique-for-this-User FE random number, the User FE network address (possibly a local VPN address) and optionally some other helper information.

It should be understood that message sequence 701 to 709 illustrates only one possible message sequence for mutual authentication between the ID Token 224 and the Authentication and Distributed Data Storage Management System 204. Other procedures can be employed, such as those used by the various smart cards available on the market.

At message 711, the User FE 208 sends the ticket over an encrypted channel (E(ticket)) to the ID Token 224.

At message 713, the ID Token decrypts the ticket and passes it to the User Terminal 222, which, in turn, sends it to Service Provider Agent 220 by, by way of example only, completing the Service Provider Agent's HTML form.

At message 715, the Service Provider Agent 220 connects to the Service Provider FE 205, and sends the ticket to the Service Provider FE 205. Service Providers can be considered to have more or less a permanent connection to the Authentication and Distributed Data Storage Management System 204. As a result, the Service Provide FE 205 already has the Service Provide ID. If there is no such permanent connection, the Service Provider Agent 220 and Service Provider FE 205 perform mutual authentication and session key generation as discussed above in connection with authentication of the ID Token 224 and User FE 208. In this manner, the Service Provider ID is known to the Service Provider FE 205.

At message 717, the Service Provider FE 205 receives the ticket and obtains the network address of the issuing User FE 208 from the ticket. The Service Provider FE 205 then sends the ticket to the so-identified User FE 208, requesting the User ID and, optionally, the User Data Encryption Key.

At message 719, the User FE 208 finds the data structure 245 associated with the ticket received from the Service Provider FE 205 and replies to the Service Provider FE 205 with the User ID and User Data Encryption Key. After this data is transmitted to the Service Provider Front End 205, the data structure 245 can be deleted from the random-access memory of the User FE 208.

At message 721, the Service Provider FE 205, which has both the User ID (from message 719) and Service Provider ID uses both identifiers to derive a resource identifier (i.e., the file name of a Data Container associated with the Service Provider/User ID pair). In exemplary embodiments, this resource identifier is derived by using the User Id and Service Provider ID as inputs to a one-way function (Obf(UserID, SP ID)) as described above. This resource identifier is sent to the DDS Management engine 210 as message READ(DC Name).

At message 723, using the information dispersal algorithm and resource identifier, the Data Collector 211 of the DDS Management engine 210 gathers enough segments of the stored resource (i.e., Data Container) from the Distributed Data Storage System 216, assembles the data and sends the user data to the Service Provider FE 205. The Service Provider FE 205 receives the Data Container (DC) and, if encrypted, decrypts the data using the User Data Encryption Key it received from the User FE 205 in message 719.

At message 725, the Service Provider FE 205 sends the Data Container to the Service Provider Agent 220 in the same form it was received from the Service Provider Agent 220. The data is preferably encrypted using a session key established by the Service Provider Agent 220 and the Service Provider FE 205 during their mutual authentication session.

Figure 7B:
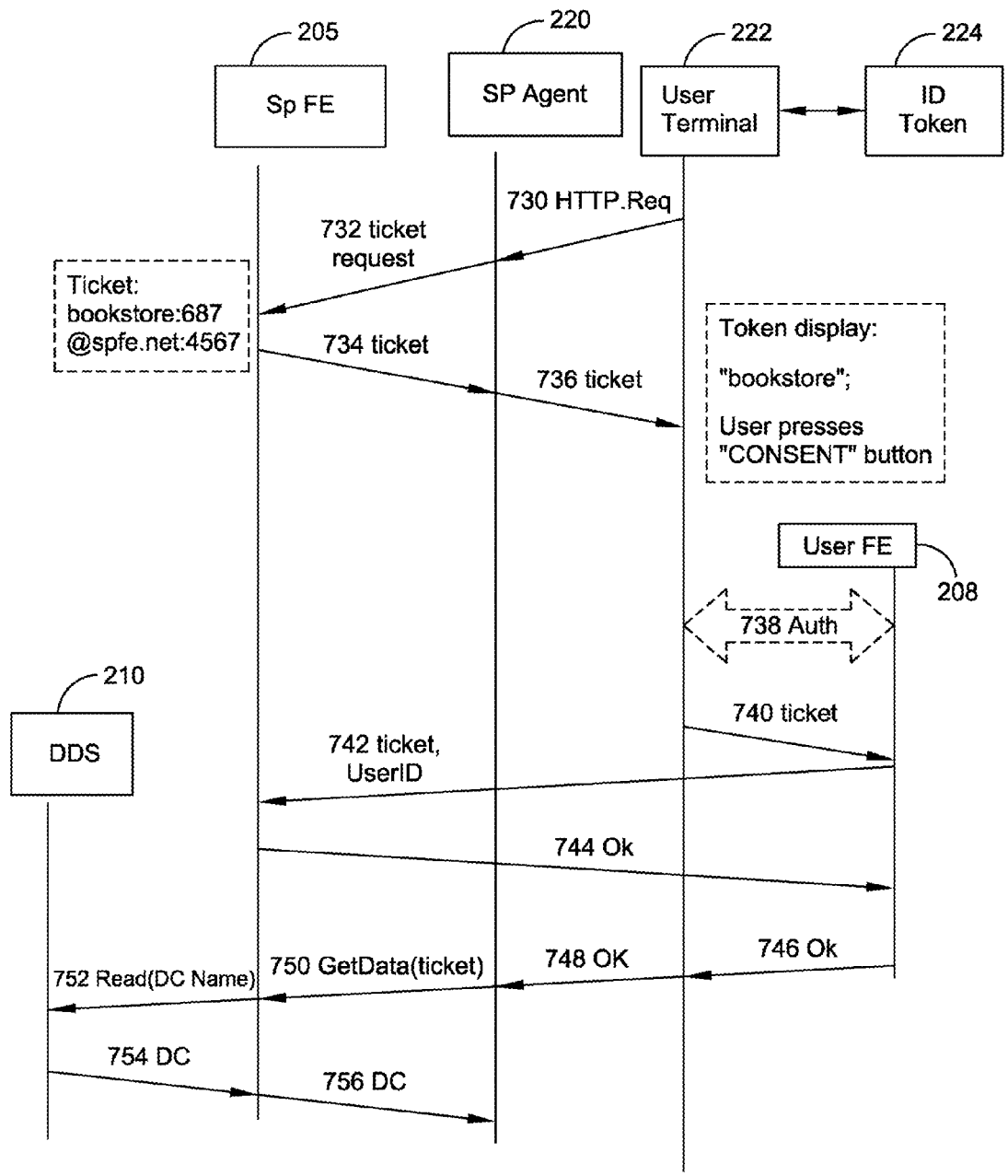
FIG. 7B is a message sequence chart for user authentication at a Service Provider and user data retrieval according to a second embodiment of the present invention.

FIG. 7B is message sequence diagram for user authentication at a particular Service Provider Agent 220 where the temporary transaction identifier ("ticket") is issued by the Service Provider FE 205 (as opposed to the User FE 208 as shown in the sequence diagram of FIG. 7A). In this approach, the Service Provider Agent 220 requests a new ticket from the Service Provider FE 205. The Service Provider FE 205 generates a new ticket and assigns it to this particular Service Provider Agent 220. The Service Provider Agent 220 provides this ticket to the ID Token 224. The ID Token 224, in turn, authenticates itself according to an authentication procedure and produces the ticket to User FE 208. The User FE 208 links this ticket with the User ID and sends this linked ticket to the Service Provider FE 205, which issued the ticket. The Service Provider FE 205 then links both the User ID and Service Provider Agent ID and requests DDS Management engine 210 for the user data that corresponds to this ID pair. Finally the data is retrieved and sent to the Service Provider Agent 220.

With specific reference to the information sequence diagram of FIG. 7B, at message 730, the user begins the interaction with the Service Provider Agent by sending an HTTP request (e.g. by pressing the image of an HTML authentication button on the webpage of the Service Provider Agent's webpage).

At message 732, the Service Provider Agent 220 requests a ticket from its Service Provide FE 205. It is assumed that the Service Provider Agent 220 is already authenticated in the Service Provider FE 205. The Service Provider FE 205 knows the Service Provider ID and, therefore, (optionally) a human-readable presentation of the Service Provider's name, e.g. "bookstore". This human readable presentation may be included in the ticket issued by the Service Provider FE 205. The Ticket issued by the Service Provider FE 205 may have, for example, the following URI (Universal Resource Identifier) form: spname:nonce@host:port, where "spname" is the human-readable presentation of the Service Provider (e.g., bank name, airline name etc), "nonce" is a number used once (e.g., any sequence which makes the ticket unique), and "host:port" denotes the Internet address of the Service Provider FE 205. So, in the present example, the ticket may be: bookstore:687@spfe.net:4567.

At message 734, the Service Provider FE 205 sends the ticket to the Service Provider Agent 220.

At message 736, the Service Provider Agent 220 relays the ticket to the User Terminal 222, which presents the ticket to the ID Token 224. If the ID Token 224 is equipped with a display (See FIGS. 3B, 3C, 3D), the ID token can extract the service provider's name from the ticket and show this name (e.g., "bookstore") to the user. This step helps assure the user that the Service Provider has been checked and verified by the authentication system, and reduces possibilities for so-called "phishing."

The user then presses the "CONSENT" button on the ID Token 224 to start the ID Token authentication procedure. The authentication of the ID Token 224 may be the same procedure described in connection with FIG. 7A at messages 701 to 709 (illustrated in FIG. 7B simply as authentication messages 738). The one difference is that the ticket is transferred from the ID Token 224 to the User FE 208 (message 740) as opposed to vice versa once authentication has been completed.

At message 742, using the "host:port" part of the ticket to address the corresponding Service Provider FE 205, the User FE 208 now sends the ticket and User ID (received from the ID Token 224 during authentication step 738) to the Service Provider FE 205 that issued the ticket.

At message 744, the User FE 208 receives confirmation from the SP FE 205 of successful ticket receipt. At message 746, the User FE 208 relays this confirmation to the ID Token 224, via the User Terminal 222. The ID Token 224, via the User Terminal 222, sends the confirmation to the Service Provider Agent 220.

At message 750, the Service Provider Agent 220 sends a request (GetData(ticket)) to the Service Provider FE 205 for the user data. The request includes the ticket received with message 734.

The Service Provider FE 205 receives the data request. The Service Provider FE 205 has the User ID (from message 742) and Service Provider ID (received during its authentication procedure with the Service Provider Agent 220). The Service Provider FE 205 can combine both IDs to obtain the Data Container file name. As discussed above, the Data Container name is obtained by entering the User ID and Service Provider ID (or concatenation or derivation thereof) into a one way function to (i.e., Obf(UserId,SpID)). At message 752, the Service Provider FE sends the data container name as part of a READ request to DDS 210 (i.e., READ (DC Name)).

At message 754, the DDS 210 uses Data Collector 211 to gather and assemble segments of the Data Container and sends the assembled user data back to the Service Provider FE 205.

At message 756, the Service Provider FE 205 sends the Data Container to the Service Provider Agent 220 in the same form it was received from this Service Provider Agent 220 (e.g., in encrypted or unencrypted form).

As should be appreciated based on the foregoing description the User ID parameter stored in the ID Token's memory is very sensitive from a security point of views being that it is used in retrieval of data from the Distributed Data Storage System 216. The alternative embodiments discussed below in connection with FIGS. 7C and 7D allow the User ID to never leave the ID Token. Generally speaking, the Service Provider ID is not as sensitive from a security point of view.

Figure 7C:
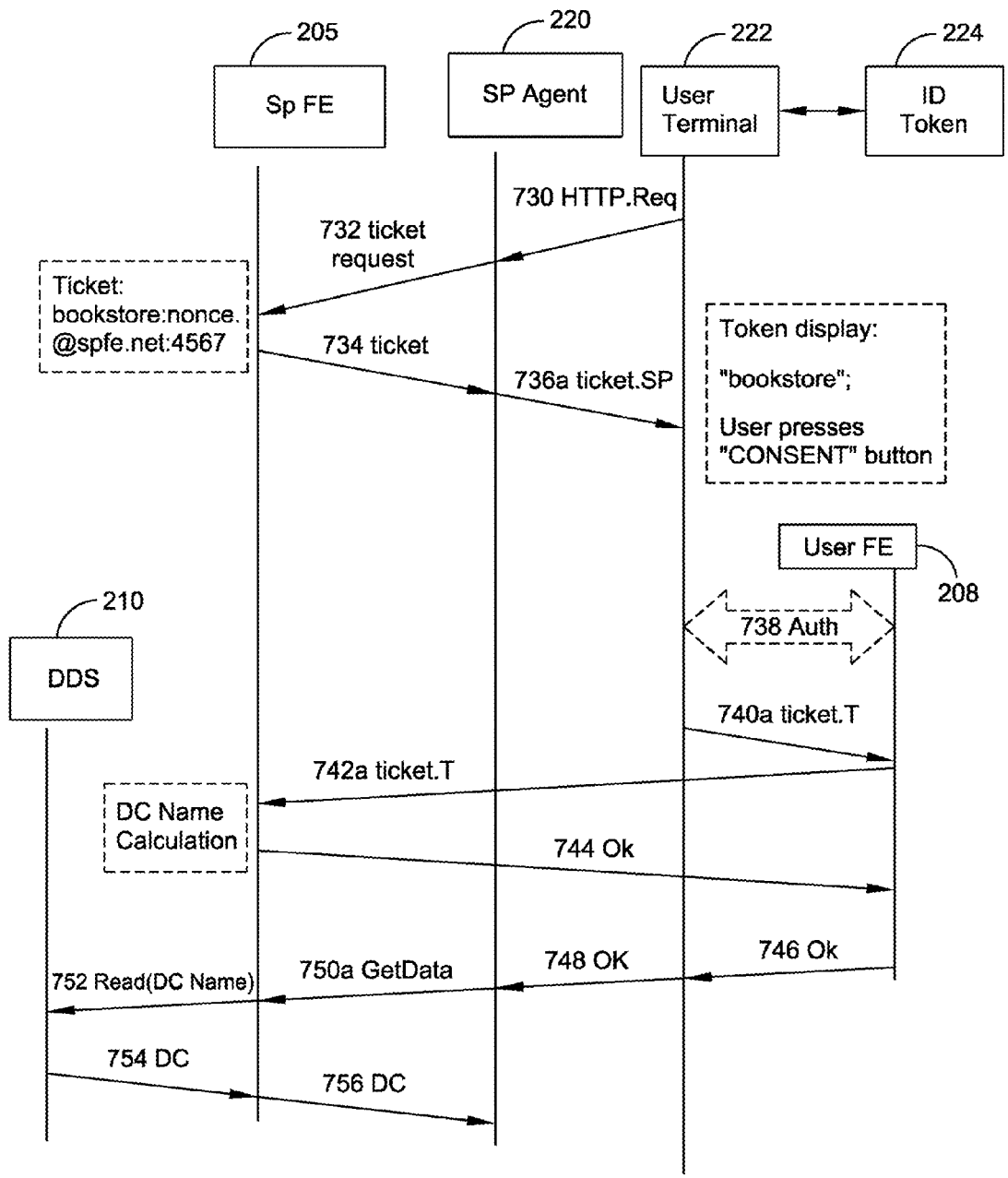
FIGS. 7C and 7D are alternative embodiments of the message sequence chart of FIG. 7B.

FIG. 7C illustrates an alternative embodiment of the message sequence diagram of FIG. 7B. This embodiment provides enhanced protection of both the User ID and the Service Provider ID that are used in deriving the resource identifier that is used in retrieval of the user data by the distributed data storage management system 210. This embodiment uses the "nonce" portion of the ticket (shown as number "687" in FIG. 7B and generically as "K" in FIG. 7C) in a specialized way, described below. Messages from FIG. 7C that are identical to those in FIG. 7B are identified with the same reference number and modified messages are identified with the corresponding reference number from FIG. 7B with an appended "a".

With specific reference to the information sequence diagram of FIG. 7C, messages 730, 732 and 734 are unchanged. However, the Service Provider FE 205 generates a pair of nonce numbers K and M before sending the ticket message 734 rather than just one number. The value of number M depends on the value of number K. The value of K is a random number. K is sent to the Service Provider Agent 220 in the ticket message 734 (bookstore:nonce.k@spfe.net:4567) but M is kept as a secret in the Service Provider FE memory.

After receiving the ticket message 734, the Service Provider Agent 220 does not simply forward the ticket to the user terminal (as in FIG. 7B). Rather, the Service Provider Agent 220 modifies the nonce (i.e., K) according to the following formula: SpK=F1(SpID,K). The Service Provider Agent 220 then sends along the modified ticket "ticket.SP" in message 736a (i.e., bookstore:nonce.SpK@spfe.net:4567 or bookstore:nonce.F1(SpID,K)@spfe.net:4567).

The User Terminal 222 receives ticket.SP and presents it to the ID Token 224. The ID Token 224 modifies the SpK value to derive a TokenK value, which equals F2(UserID,SpK). The ID Token 224 provides a new ticket—"ticket.T" (i.e., bookstore:nonce.TokenK@spfe.net:4567 or bookstore:nonce.F2

(UserID, F1(SpID,K))@spfe.net:4567) to the User Terminal 222, which forwards this ticket to the User FE 208 in message 740a.

The User FE 208 forwards this ticket.T in message 742a to the Service Provider FE 205. When the Service Provider FE 205 receives ticket.T, the final calculation is performed: Data Container Name=F3(M,TokenK,). Functions F1, F2 and F3, along with the values of the K, M pair, ensure that the Data Container Name (i.e., the resource identifier) depends only on the User ID/Service Provider ID pair, and not on K or M, and that the Data Container Name is unique for all Service Provider ID/User ID pairs. The value of M serves to remove the influence of K in the output of F3.

One possible implementation of the above protocol is based on the Paillier Cryptosystem. To use this algorithm two constant parameters are required. The first is a Paillier Cryptosystem public key (known to all participants) and some constant number C. The constant C is used because Paillier cannot encode negative numbers. The C constant introduces an offset in a Data Container's name (i.e., SpID|UserID+C), thus accounting for Paillier features while leaving a unique Data Container name. In this case, the Service Provider FE 205 obtains or generates a random number M, encrypts it with a Paillier public key (to form random number K) and sends the number to the Service Provider Agent 220 in message 734. The Service Provider FE 205 records the random number M for later use. The random number K corresponds to an encrypted version of M, i.e., E(M). The public key for decryption is known to the nodes participating in the procedure. The Service Provider Agent 220 uses a bit shifted version of SpID. Specifically, the Service Provider Agent 220 shifts SpID (i.e., SpID') in such a way that SpID'+UserID equals the concatenation of SpID and UserID (i.e, SpID|UserID). The Service Provide agent does not know the User ID, but does know the number of bits in the User ID. That is, assume SPID is 110011 and the User ID is 010101. To concatenate these IDs, the SpID is left-shifted six bit positions (i.e., the number of bits in the User ID) to provide SpID': 110011000000. Adding the User ID to SpID' will provide the concatenation of SpID' and User ID: 110011010101. Next, the Service Provider Agent 220 multiplies the result of the bit shift by K: F1(SpID,K)=E(SpID')*K=E(SpID')*E(M)=SP_transform=SpK=E(M+SpID'). All multiplications are modulus operations. The ID Token 224 then encrypts the UserID with the public key and multiplies the result by SpK: F2(UserID, SpK)=E(UserID)* SP_transform=token transform=TokenK=E(M+SpID'+UserID)=E(M+SpID|UserID). Now, the Service Provider FE 205 can perform the final transform. SpFE encrypts a difference (C−M) and multiplies the result by what it received from the ID Token 224, thus obtaining a Data Container name (i.e., Obf(C+SpID|UserID): F3(C−M, TokenK)=E(C−M)*TokenK=E(C−M+M+SpID|UserID)=E(C+SpID|UserID).

Per the foregoing description, the Service Provider FE 205 can derive the Data Container name without the User ID being transmitted through the system. The data container name (i.e., resource identifier) can be derived by the Service Provider FE 205 after receipt of message 742a.

Messages 744 to 750 are used only to synchronize the User Terminal 222 (i.e., the browser) and the Service Provider Agent 220 (i.e., the HTTP Server). Messages 744 to 748 and 746 to 756 are identical to those discussed above in connection with FIG. 7B. Message 750a is simply a GetData request, as no ticket is required.

Figure 7D:
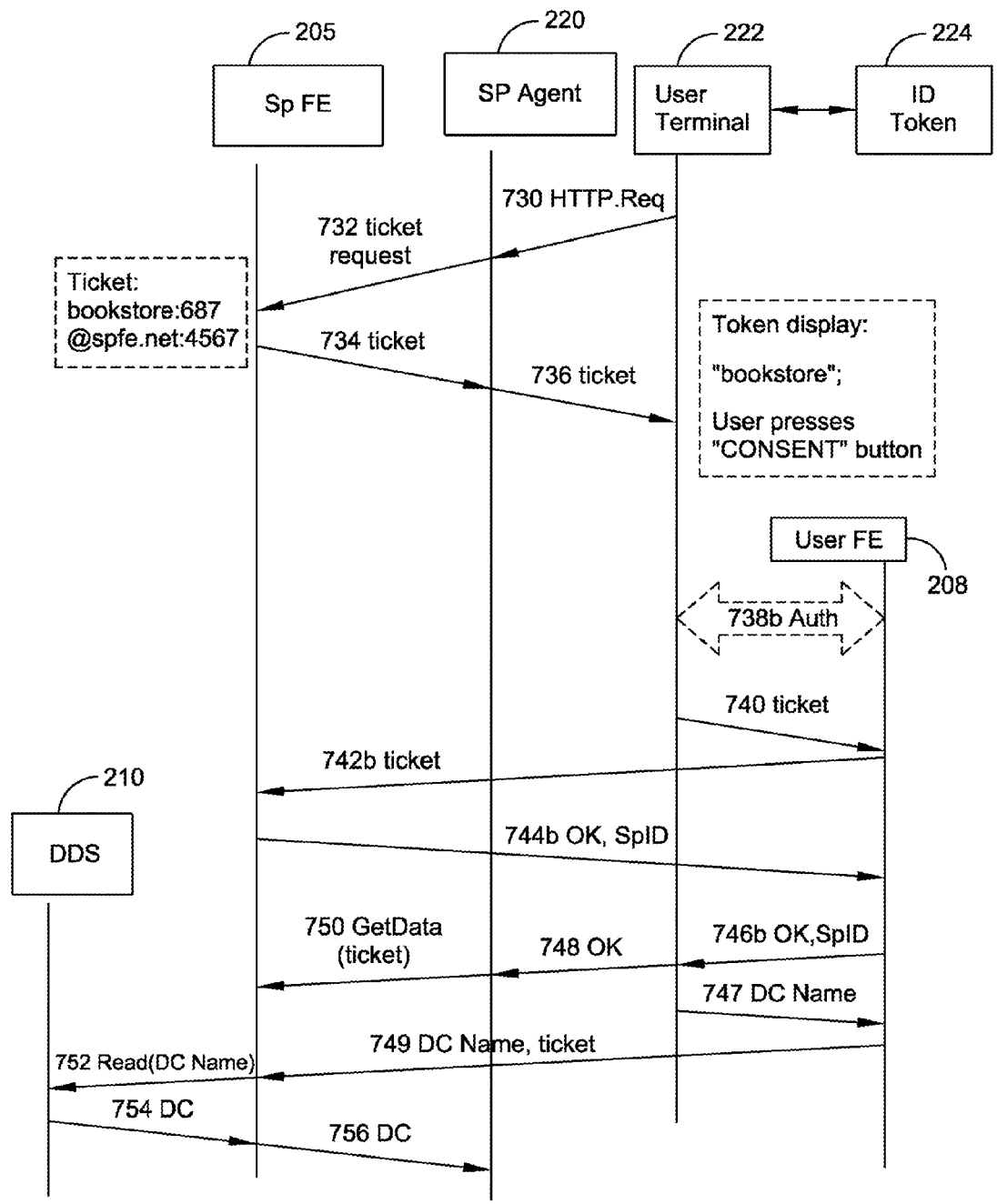

FIG. 7D illustrates a second alternative embodiment of the message sequence diagram of FIG. 7B. In this embodiment, the ID Token 224 calculates the resource identifier using the Service Provider ID and the User ID. As such, the User ID does not have to be transmitted outside of the ID Token 224. Messages from FIG. 7D that are identical to those in FIG. 7B are identified with the same reference number, and modified messages are identified with the corresponding reference number from FIG. 7B with an appended "b". Additional messages 747 and 749 are also illustrated.

With specific reference to the information sequence diagram of FIG. 7D, messages 730, 732, 734 and 736 are unchanged. The token authentication process illustrated by messages 738b is the same as that described above for message 738 of FIG. 7B only the User ID is not transmitted from the ID Token 224 to the User FE 208. Message 740 is unchanged, but only the ticket (and not the User ID) is sent from the User FE 208 to the Service Provider FE 205 in message 742b.

At message 744b, the Service Provider FE 205 sends the Service Provider ID to the User FE 208.

At message 746b, the User FE 208 sends this Service Provider ID to the ID Token 224 via User Terminal 222.

The method sends messages 748 and 750 as with the method of FIG. 7B. However, in parallel, the ID Token 224 calculates the resource identifier using the received Service Provider ID and its own internally stored User ID, i.e., Obf (UserID, SpID). The ID Token 224 sends the so-calculated resource identifier to the User FE 208 in message 747, which in turn sends the resource identifier to the Service Provider FE 205 with the ticket in message 749.

Messages 752, 754 and 756 are unchanged from the description of FIG. 7B.

Key Management:

Key Management engine 212 is responsible for generating new ID tokens 224 and initial registration of those tokens in the system. Key Management engine 212 is also responsible for ID token deactivation and ID token replacement.

Figure 8:
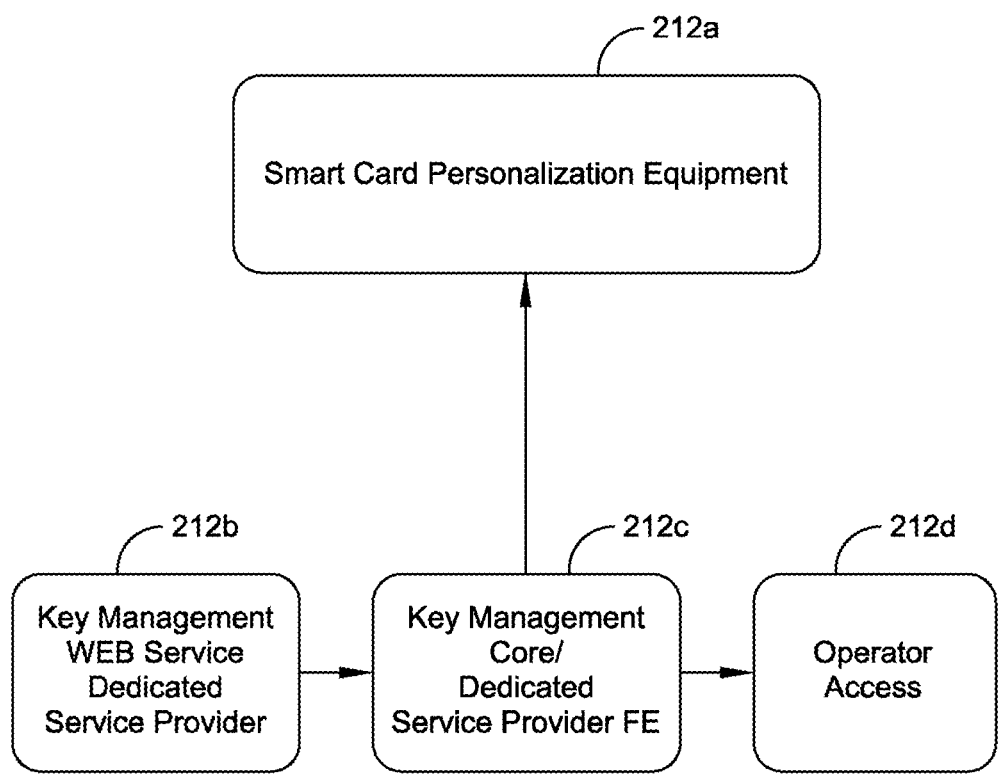
FIG. 8 illustrates the components of an embodiment of a Key Management System.

In embodiments, Key Management engine 212 is a multi-part system, as illustrated in the block diagram of FIG. 8. Key Management engine 212 includes smart card personalization equipment 212a. In embodiments, smart card personalization equipment is a specially designed computerized machine that produces smart cards and writes data into smart card memory. This equipment 212a is controlled by Key Management Core program 212c, which serves commands from an operator's console 212d (e.g., requests to produce new batches of tokens). Another source of requests to produce new tokens comes from Key Management WEB service site 212b (e.g., token replacement requests).

For security reasons, is it preferred that User IDs are not stored in the system. Therefore, a Master Token is used to replace lost or compromised ID tokens 224. The Master Token holds the information needed to replace and old ID Token 224 (e.g., Token ID, User ID and the optimal User Data Encryption Key(s)). When a user is authenticated in the system with the user's Master token, a new ID token/Master token pair may be generated and sent to the User. At the same time previously used working tokens are deactivated (e.g. by triggering a "deactivation" flag for the Token ID in the data container associated with that token).

Figure 9:
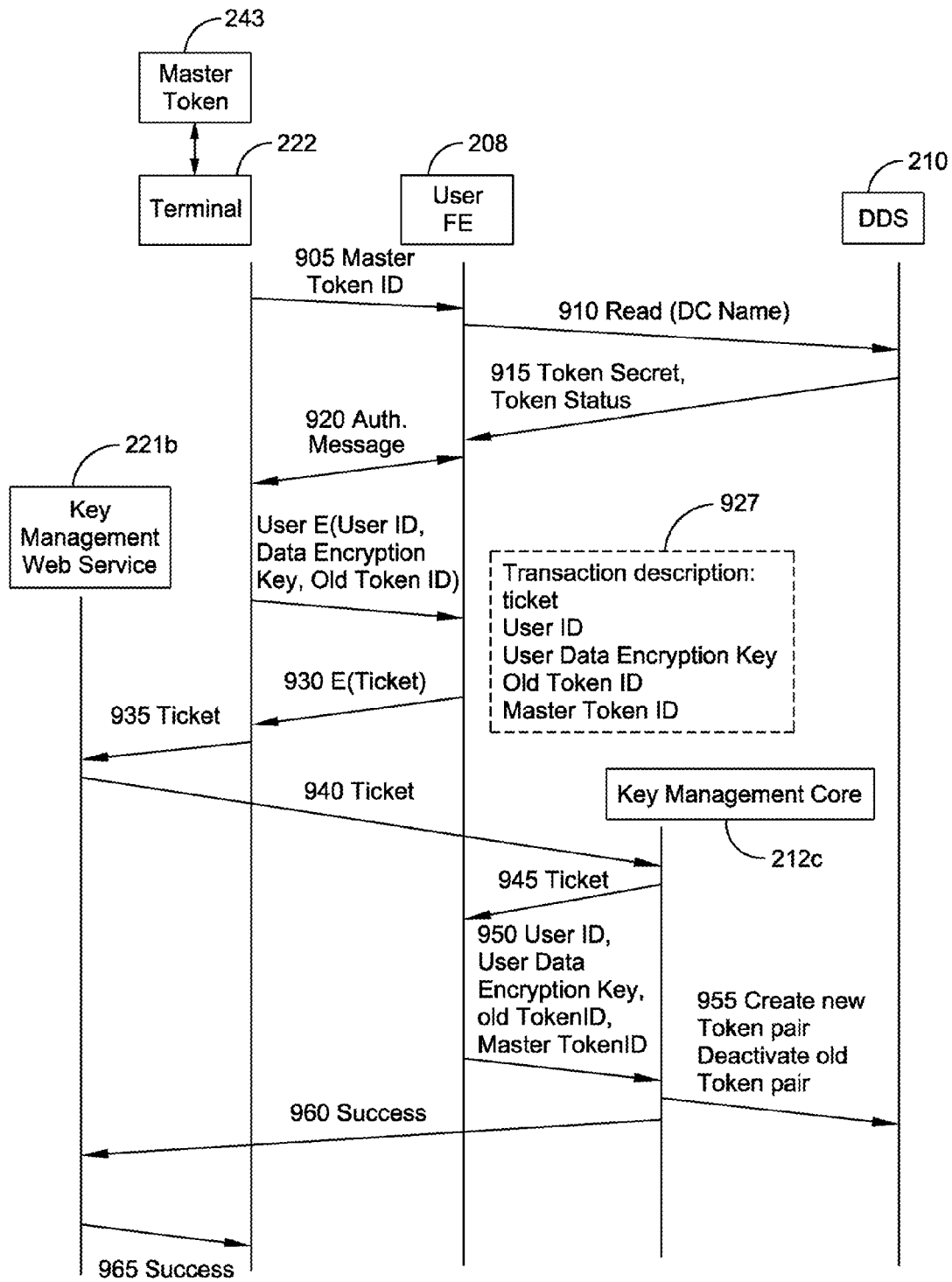
FIG. 9 is message sequence chart illustrating a method of generating and issuing a new ID token pair for replacement of an ID token.

FIG. 9 is a message sequence for replacement of a ID Token 224. The procedure is quite close to that depicted in FIG. 7A. To deactivate a lost or stolen ID Token 224, the user directs the browser of the user Terminal 222 to the Key Management WEB Service page provided by the Key Management Web Service component 212b of Key Management engine 212 and authenticates himself using the user's master Token 243. Similar to message 701 of FIG. 7A, at message 905, the Master Token 243, through Terminal 222, provides a Master Token ID to the User Front End 208.

Like message 703 of FIG. 7A, at message 910, the Use FE 208 calculates a resource identifier (i.e., Obf(TSPID, Master Token ID)) and sends this resource identifier to the DDS system 210 with a READ request, i.e., READ(DC Name).

The DDS Management engine 210 uses the data container name to retrieve the data container containing the master token's secret key(s) and status from DDS System 216. At message 915 (like message 705 of FIG. 7A), this information is sent to the User FE 208 as part of a data container.

An authentication message 920 (like message 707 of FIG. 7A) is then sent from the User FE 208 to the ID Token 224.

When compared to message 709 (FIG. 7A), message 925 carries additional information—the Token ID of the ID Token 224 to be replaced. This additional information is stored in the User FE transaction description 927, which includes: (i) a temporary transaction identifier ("ticket"), (ii) User ID, (iii) User Data Encryption Key (optional), (iv) Old Token ID and (v) Master Token ID.

Messages 930-945 show the "ticket" path through the system and are fully equivalent to messages 711 to 717 of FIG. 7A only the Key Management Core 212c replaces the Service Provider FE 205. In fact, the Key Management Core 212c can play the role of "special" Service Provider FE for Key Management WEB Service 212b, which, in turn, can be considered as a kind of Service Provider. The difference is, however, that after production of a ticket, Key Management Core 212c receives from the User FE 208 not only the User ID and optional User Data Encryption Key, but also the ID of the ID Token 224 to be replaced (message 950).

At this point in the sequence, the Key Management engine 212 has all the information necessary to produce a new pair of tokens (normal every day token and master token) that will point to the same User ID. A new token ID and secret keys are generated, and this information is written into new tokens by the Smart Card Personalization Equipment 212a. As illustrated by message 955, a new token record is provided to the DDS Management engine 210 and any old tokens will be marked as "deactivated." Message 960 reports the success/failure status of the operation to the Key Management WEB Service 212b for communication back to the to the User Terminal 222 in message 965.

Security Measures:

A number of measures are taken in the system to keep authentication secrets and user data privacy as safe as possible. First, identifiers (i.e., Token ID, Service Provider ID, User ID) used in the system should be long integer numbers, for example, at least 64 bits in length. Those numbers are produced by a random number generator. This makes it difficult to find existing identifiers by an exhaustive search method. Second, all data exchange is preferably secured with secret keys that are at least 128 bits long. Furthermore, Data Container identifiers are one-way ciphered with resulting name lengths being more than 512 bits. It is impossible (in any practical manner) to restore the User ID and/or Service Provider ID from a Data Container name. User data itself may be stored in encrypted form with secret keys that are hashes of SpID and UserID that are known to the system only for the active period when the user communicates with the system. Moreover, as a Service Provider option, Data Containers may be ciphered by the Service Provider before they are sent to the storage system. Finally, in embodiments, the authentication system does not store (on any permanent basis) the Service Provide ID that it assigns to a given service provider or the User ID that it assigns to an ID Token. As such, the authentication system by itself cannot gain access to a data container associated with a Service Provider ID/User ID pair without the service provider and ID Token going through the requisite authentication procedures. That is, since the authentication system does not separately maintain lists of User IDs and Service Provider IDs, neither it nor unscrupulous other parties can derive the resource identifier needed to recover or retrieve the data container.

An exemplary use of the Authentication and Data Storage system described herein is for providing third party authentication services in a Service Provider/User transaction and for safely storing the user's profile data on behalf of the Service Provider. A typical Service Provider/User interaction would be between a vendor (e.g., on-line bookstore) and a user who has an account with the vendor. The user accesses the vendor's website, presents the user's ID Token, the authentication procedure is performed and if the user is authenticated, the data container containing the user's profile data (e.g., name, account information, customer loyalty information, billing information, etc.) is retrieved for use by the vendor. When the transaction is completed, the user data can be updated and the vendor sends the data container back the storage system for safe storage. In another typical use of the system, the user can present the ID token to a suitable terminal at the physical store of the vendor. The authentication procedure is again performed, and if authentication is successful, the data container containing the user's profile information is retrieved. When the transaction is completed, the user data can be updated and the vendor sends the data container back the storage system for safe storage. This application relieves the user of the need to carry multiple loyalty cards for multiple vendors.

On-Line Retailer Example:

Application of the system in an on-line retail environment is now discussed. In this example, there are three participants in the system: (1) the on-line retailer (hereinafter referred to as On-Line Bookstore); (2) the Customer (e.g., the individual that shops with the On-Line Bookstore); and (3) the Third-Party Authenticator/Data Storer (i.e., the entity that runs the Authentication and Distributed Data Storage Management System 204) (hereinafter, referred to as "Third-Party Authenticator").

The Customer establishes an account with the Third-Party Authenticator and the Third-Party Authenticator issues one or more ID Tokens 224 to the Customer and a Master Token 243. For example, in the case of hardware tokens, these tokens are mailed to the Customer. If the token is an application that is run on the Customer's smart phone or PDA, the token application is downloaded to the device by the Customer. The ID Tokens 224 include the User ID and encryption key(s) discussed above, and the Master Token 243 includes the User ID, Master Token ID and encryption key(s) discussed above. A data container is stored in the system corresponding to each token, including the key(s) for token authentication and token status. This data container is accessed using the Token ID and another data element (e.g., ID of the Third-Party Authenticator).

The On-Line Bookstore also establishes a relationship with the Third-Party Authenticator to provide third-party authentication services and third-party data storage for the On-Line Bookstore. The Third-Party Authenticator provides any necessary software and tokens for communications with the Authentication System and the Service Provider ID to the On-Line Bookstore. The On-Line Bookstore then adds an icon or other selectable link on its website.

In this example, it is assumed that the Customer has established a relationship with (i.e., registered with) the On-Line Bookstore. That is, the Customer has at some point provided user information to the On-Line Bookstore, which the On-Line Bookstore uses to create a customer profile associated with the Customer. This customer profile can include information such as customer name, address, customer account number, financial instrument information (e.g., credit card number and billing address), account username, customer preferences, and the like. Note that there is no need for a user password as the user has already been authenticated. Over time, the On-Line Bookstore can supplement this information with historical information such as the Customer's purchase history, trends and preferences, loyalty status, etc. The On-Line Bookstore provides this information to the Third-Party Authenticator as a data container for storage in the Distributed Data Storage System 216. This data container is identified and retrieved using a resource identifier, which is derived from the unique ID assigned to the On-Line Bookstore (Service Provider 10) and the unique User ID stored in the ID Token 224 issued to the Customer. The process for initial creation of a data container is identical to requesting a data container (i.e., READ command) only message 721 (FIG. 7A) and messages 752 (FIGS. 7B, 7C and 7D) would send the resource identifier with a CREATE rather than READ request. In response to the CREATE request, a data container by the resource identifier name is created. Data for initial storage in the container can also accompany the CREATE request.

The Customer accesses the website of the On-Line Bookstore and clicks on the authentication icon (or link) displayed on the webpage. Optionally, a new webpage is displayed prompting the Customer to present the Customer's ID Token, such as by connecting the ID Token to the USB interface of the Customer's home computer. The name of the On-Line Bookstore may be displayed on the Customer's ID Token, and the Customer hits the "consent" button on the ID Token. The authentication procedures discussed above for authenticating the ID Token (and thus the user) and the Service Provider are performed amongst the Customer's ID Token, the service provider agent of the On-Line Bookstore and the Authentication System operated by the Third-Party Authenticator. Assuming the On-Line Bookstore and the Customer have been properly authenticated, the Third Party Authenticator uses a resource identifier (derived using the User ID of the Customer's ID Token and the Service Provider ID assigned to the On-Line Bookstore) to retrieve and/or reconstruct from the storage system the Data Container associated with the On-Line Book Store/Customer pair and transmits this Data Container to the On-Line Bookstore. The Data Container contains the Customer's user profile. As such, the identify and user information of the customer is revealed to the On-Line Bookstore and can be used in interacting with the Customer and performing transactions (e.g., purchases). If no changes are made to the use data, the session can terminate (with no changes to the data container in the distributed data storage system) or the received data can be written back into the distributed data storage system with a WRITE request.

Point-Of-Sale Retailer Example:

The system operates in much the same way with non-ecommerce applications, i.e., where the Customer visits the retail location of the service provider. In this example, assume the service provider is a retail bookstore (Retail Bookstore). Rather than the Customer logging into a website, the Customer presents the Customer's ID Token to a token interface connected to the Retail Bookstore's point-of-sale terminal or even a kiosk. The point-of-sale terminal acts as the Customer's user terminal (i.e., home computer) and communicates between the ID Token and the User Front End 208 of the Third-Party Authenticator's system. Authentication of the Customer and the Retail Bookstore is performed as described above and if successful the Third Party Authenticator retrieves the Data Container associated with the Retail Bookstore/Customer pair and provides the Data Container to the Retail Bookstore. For example, the Data Container is provided to the Retail Bookstore's system for display to the retail associate with the point-of-sale terminal. As such, the identity of the Customer, billing information, loyalty status, etc. are available to the retail associate.

Employee Rights to Access Resource Example:

The service provider may choose to trust the Authentication and Distributed Data Storage Management System 204 with storing user data associated with a specific user. Alternatively, in cases where the service provider already has a large investment in a reliable database and does not want to redesign its core technologies, it is possible to store within the Distributed Data Storage System 216 only certain pieces of information, such as the Service Provider's local user IDs that it associates with the presented user. It should be understood that this form of user data need not necessarily be, but may be, stored in a distributed format. This particular approach can be used to allow employers to authenticate their employees and provide access to secure corporate resources. The employer/corporate entity is considered the service provider and the employee is the user. The employee can use at work the same ID Token 224 that the employee uses for other service providers (e.g., on-line retailers). If the employee does not already have an ID token, then one can be provided (as a kind of bonus). The ID token can be use to gain access to secure areas (e.g., to gain access to the building, restricted floors, etc.) and to log-in to the corporate network.

When the user plugs (or otherwise interfaces) the ID Token into her work computer, the process described above is performed. The resource identifier, which is derived using the User ID assigned to the employee and the Service Provider ID of the employer, is used to retrieve from the storage system of the Third Party Authenticator the employee's local user ID for the employer's system. The employer's system has built in authorization procedures it follows to determine what resources this employee can access.

The employer benefits in a number of ways. For example, assuming the employee also uses the ID Token in the employee's personal life (e.g., in on-line and POS transactions), the ID Token has more value for the employee than a typical corporate access device (e.g., key fob). The employee, therefore, will be careful not to leave the token connected to his or her computer during lunch, etc. Moreover, to the extent the employee already has an ID Token, there is no cost to the employer for supplying the ID Token. There is also no need to return the token when the employee departs the company since there is nothing on the token itself concerning the employer. When the employee leaves the company, the system administrator simply changes the authority level associated with the employees internal ID. No changes in the data stored by the Authentication and Distributed Data Storage Management System 204 are required to effectively lock the employee out.

While the storage aspects of the system have been described above principally in connection with safe storage of private user data, it should be understood that the system is not so limited. Rather, the system can used to store, and provide authentication services in connection with, any protected resource. The resource may be a software application, an object or place, a document, a page, a file, executable code, or other computational resource, communication-type resource, etc. that is only accessed or retrieved if the user and service provider are both authenticated. Possible applications of the technology described herein also include, but are not limited to, (1) use of Internet resources; (2) authorization for use of software programs or hardware (e.g., to get an access to a program, or to special features, as a service); (3) loyalty cards and other customer identification means in stores, restaurants, etc.; (4) transport cards (e.g., public transit, ski lifts, etc.); (5) use of safe storage of credit/debit cards account information and/or facilitating secure internet payment or other secure financial transaction (e.g., brokerage transaction); (6) secure access identification systems for entrance to buildings, logging into work, and the like; (7) post-financial transaction transactions, such as a proxy for boarding passes, e-badges, tickets (e.g., movie or concert tickets); (8) personal healthcare information management and access; (9) integration of the backend storage system with existing authentication and identification systems; (10) secure and anonymous electronic elections, voting, etc.; (11) centralized documents storage for driver's license and other personal data; (12) digital signature and security certificates; (13) authorization for micropayments, "pay as you go", or "pay-per-use"; (14) user-to-user connections, e.g., business cards exchange; (15) billing systems, such as precise, up to the second registration of a service provider (e.g., attorney) time dedicated to a particular user's matter; (16) e-mail spam elimination, meaning only authenticated entities (service providers or customers) can send email messages to other authenticated entities; or (17) authentication at corporate networks and workstations; and (18) storing mail certificates which allow a user to use a mail agent (e.g., Mozilla THUNDERBIRD™ agent or Microsoft OUTLOOK® agent on any computer).

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. An authentication and data retrieval method for providing access to a service provider to user information associated with a user's relationship with the service provider, comprising the steps of:
    authenticating using a user token a user presenting the user token at a user terminal, the user token having stored thereon a user ID;
    deriving a resource identifier using at least two data input elements, the at least two data input elements including the user ID of the user and a service provider ID of the service provider, wherein the user information is stored in a storage network and the resource identifier is associated with the user information;
    retrieving the user information from the storage network using the resource identifier; and
    providing the retrieved user information to the service provider.

2. The method of claim 1, wherein the storage network is a dispersed storage network comprising a plurality of storage nodes, wherein the user information is stored in the storage network in accordance with an information dispersal algorithm (IDA).

3. The method of claim 2, wherein the storage network has stored therein for each user token a data container including a status of the user token and one or more encryption keys specific to the user token.

4. The method of claim 2, further comprising the steps of deriving a second resource identifier using at least an ID specific to the user token and a second data element that is not specific to the user token, and retrieving the data container using the second resource identifier.

5. The method of claim 2, wherein the user information retrieving step includes the step of reconstructing the user information from the plurality of storage nodes, wherein the reconstructed user information is provided to the service provider.

6. The method of claim 1, wherein the deriving step includes the step of deriving the resource identifier using a one way function.

7. The method of claim 1, wherein the user ID and service provider ID are separately received by an authentication system in communication with the storage network, wherein the authentication system performs the step of deriving the resource identifier using the user ID and service provider ID.

8. The method of claim 1, wherein the resource identifier deriving step is performed by the token, the method further comprising the steps of:
    receiving at an authentication system the resource identifier from the user terminal; and
    using the received resource identifier in performing the retrieving step.

9. The method of claim 8, further comprising the steps of:
    issuing from the authentication system a temporary transaction identifier to the service provider agent, the temporary transaction identifier being associated with an access or authentication request; and
    thereafter receiving the temporary transaction identifier at the authentication system from the user terminal.

10. The method of claim 9, further comprising the step of the service provider agent forwarding the temporary transaction identifier to the user terminal, wherein the token performs the resource identifier deriving step after receiving the temporary transaction identifier.

11. The method of claim 1, further comprising the steps of:
    issuing from an authentication system a temporary transaction identifier to a service provider agent, the temporary transaction identifier being associated with an access or authentication request, the temporary transaction identifier including a name identifier associated with the service provider;
    transmitting the temporary transaction identifier to the user terminal from the service provider agent for display of the name identifier to the user using the token;
    receiving a consent indication from the user;
    after receipt of the consent indication, receiving the temporary transaction identifier from the user terminal; and
    performing the resource identifier deriving step after receiving the temporary transaction identifier at the authentication system.

12. The method of claim 1, wherein the storage network stores a plurality of separate sets of user information associated with the user, each set being associated with a respective user/service provider pair, wherein each set of user information is retrievable using a respective resource identifier derived using the user ID and a respective service provider ID.

13. The method of claim 1, wherein the user token is a hardware token.

14. The method of claim 1, further comprising the step of, after providing the retrieved user information to the service provider, receiving a set of user data for the user from the service provider for storage in the storage network in association with the resource identifier, wherein the storage network serves as the service provider's storage of the received user data.

15. The method of claim 1, wherein the user data is all or part of the user's customer profile with the service provider.

16. The method of claim 1, wherein the step of deriving the resource identifier includes the steps of:

combining the user ID and service provider ID to provide a data element; and
encrypting the data element with a public key of a public/private key encryption pair.

17. A method of providing secure data storage and access to stored data, comprising the steps of:
receiving user information;
storing the user information in a dispersed storage network comprising a plurality of storage nodes in accordance with an information dispersal algorithm (IDA); and
associating the user information with a resource identifier for use in retrieving the user information from the dispersed storage network;
receiving the resource identifier and retrieving the user information from the dispersed storage network using the resource identifier, wherein the resource identifier is derived from an output of a one way function using at least two data input elements,
wherein the at least two data input elements comprise a user ID and a service provider ID.

18. The method of claim 17, wherein the user information retrieving step includes the step of reconstructing the user information from the plurality of storage nodes.

19. The method of claim 17, wherein the user information is associated with a user's relationship with a service provider, the method further comprising the step of providing the retrieved user information to the service provider.

20. The method of claim 19, further comprising the steps of:
receiving the user ID and the service provider ID at an authentication system; and
deriving the resource identifier with the authentication system.

21. The method of claim 19, further comprising the steps of:
receiving the resource identifier at an authentication system from a user terminal.

22. The method of claim 21, further comprising the steps of:
receiving a service provider ID at the user terminal;
deriving the resource identifier with a token in communication with the user terminal; and
transmitting the resource identifier from the user terminal to the authentication system.

23. The method of claim 17, further comprising the steps of:
issuing, from an authentication system and to one of a user terminal and a service provider agent, a temporary transaction identifier, the temporary transaction identifier being associated with an access or authentication request; and
receiving the temporary transaction identifier from the other of the user terminal and the service provider agent.

24. An authentication and data storage management system for use in a token-based authentication and data retrieval system for providing access to a service provider to user information associated with a user's relationship with the service provider, the authentication and data storage management system configured to communicate with a service provider agent and a user terminal, the authentication and data storage management system comprising:
a user front end, the user front end configured to communicate with a user token through the user terminal for authenticating a user, the user token having stored thereon a user ID;
a service provider front end, the service provider front end configured to communicate with the service provider agent for authenticating a service provider; and
a data storage management engine in communication with the user front end, the service provider front end and a storage network having stored therein the user information, the data storage management engine configured to receive a resource identifier and retrieve the user information from the storage network using the resource identifier and provide the retrieved user information for communication to the service provider agent,
wherein the resource identifier is derived using a function having at least two data input elements, the at least two data input elements including the user ID and a service provider ID of the service provider.

25. The system of claim 24,
wherein the storage network is a dispersed storage network comprising a plurality of storage nodes, wherein the user information is stored in the storage network in accordance with an information dispersal algorithm (IDA),
wherein the data storage management engine includes a data collector configured to retrieve and reconstruct the user information from the plurality of storage nodes, wherein the reconstructed user information is provided to the service provider.

26. The system of claim 24, wherein the data storage management engine is configured to derive the resource identifier using a one way function.

27. The system of claim 24,
wherein the user front end is configured to issue a temporary transaction identifier to the user terminal, the temporary transaction identifier being associated with an access or authentication request, and the service provider front end is configured to receive the temporary transaction identifier from the service provide agent and authenticate the service provider after receipt of the temporary transaction identifier, or
wherein the service provider front end is configured to issue the temporary transaction identifier to the service provider agent, and the user front end is configured to receive the temporary transaction identifier from the user terminal and authenticate the user after receipt of the temporary transaction identifier.

28. The system of claim 26, wherein the data storage management engine is configured to receive the resource identifier from the user terminal.

29. The system of claim 24, wherein the storage network stores a plurality of separate sets of user information associated with the user, each set being associated with a respective user/service provider pair, wherein each set of user information is retrievable using a respective resource identifier derived using the user ID and a respective service provider ID.

30. The system of claim 24, wherein the function combines the at least two data input elements into a data element and encrypts the data element with a public key of a public/private key encryption pair.

31. A system for providing secure data storage and access to stored data, comprising:
a dispersed storage network comprising a plurality of storage nodes; and
a data storage management system configured to receive user information and store the user information in the dispersed storage network in accordance with an information dispersal algorithm (IDA), wherein the user information is associated with a resource identifier for use in retrieving the user information from the dispersed storage network and wherein the resource identifier is derived from an output of a one way function using at least two data input elements, wherein the data storage management system includes a data collector for retrieving the user information from the dispersed storage network using the resource identifier by reconstructing the user information from the plurality of storage nodes,
wherein the at least two data input elements comprise a user ID and a service provider ID.

32. The system of claim 31, wherein the user information is associated with a user's relationship with a service provider, wherein the data storage management system is further configured to provide the retrieved user information for communication to a service provider agent.

33. The system of claim 32, wherein the data storage management system is further configured to receive the user ID and the service provider ID and derive the resource identifier with the authentication system.

34. The system of claim 33, wherein the data storage management system includes an authentication system configured to issue to one of a user terminal and a service provider agent a temporary transaction identifier, the temporary transaction identifier being associated with an access or authentication request, and receive the temporary transaction identifier from the other of the user terminal and the service provider agent.

* * * * *